US011611429B2

(12) United States Patent
Tehranipoor et al.

(10) Patent No.: US 11,611,429 B2
(45) Date of Patent: Mar. 21, 2023

(54) COMPREHENSIVE FRAMEWORK FOR PROTECTING INTELLECTUAL PROPERTY IN THE SEMICONDUCTOR INDUSTRY

(71) Applicants: University of Florida Research Foundation, Inc., Gainesville, FL (US); The University of Connecticut, Farmington, CT (US)

(72) Inventors: Mark M. Tehranipoor, Gainesville, FL (US); Domenic J. Forte, Gainesville, FL (US); Ujjwal Guin, Auburn, AL (US)

(73) Assignees: University of Florida Research Foundation, Incorporated, Gainesville, FL (US); The University of Connecticut, Farmington, CT (US)

( * ) Notice: Subject to any disclaimer, the term of this patent is extended or adjusted under 35 U.S.C. 154(b) by 298 days.

(21) Appl. No.: 16/309,397

(22) PCT Filed: Jun. 14, 2017

(86) PCT No.: PCT/US2017/037403
§ 371 (c)(1),
(2) Date: Dec. 12, 2018

(87) PCT Pub. No.: WO2017/218631
PCT Pub. Date: Dec. 21, 2017

(65) Prior Publication Data
US 2019/0165935 A1 May 30, 2019

Related U.S. Application Data

(60) Provisional application No. 62/349,876, filed on Jun. 14, 2016.

(51) Int. Cl.
*H04L 9/08* (2006.01)
*H04L 9/14* (2006.01)
(Continued)

(52) U.S. Cl.
CPC .............. *H04L 9/0825* (2013.01); *G09C 1/00* (2013.01); *H04L 9/0656* (2013.01);
(Continued)

(58) Field of Classification Search
CPC ... H04L 9/0825; H04L 9/0656; H04L 9/0662; H04L 9/08; H04L 9/14; H04L 9/16;
(Continued)

(56) References Cited

U.S. PATENT DOCUMENTS 8,417,965 B1 * 4/2013 Sundararajan .......... G06F 30/34
713/189
9,297,855 B1 * 3/2016 Jindal ..................... G06F 30/30
(Continued)

OTHER PUBLICATIONS

Plaza et al. Solving the Third-Shift Problem in IC Piracy With Test-Aware Logic Locking, IEEE Transactions on Computer-Aided Design of Integrated Circuits and Systems, vol. 34, No. 6, Jun. 2015 (Year: 2015).*
(Continued)

*Primary Examiner* — Jung W Kim
*Assistant Examiner* — Howard H. Louie
(74) *Attorney, Agent, or Firm* — Alston & Bird LLP

(57) ABSTRACT

Methods and integrated circuit architectures for assuring the protection of intellectual property between third party IP providers, system designers (e.g., SoC designers), fabrication entities, and assembly entities are provided. Novel design flows for the prevention of IP overuse, IP piracy, and IC overproduction are also provided. A comprehensive framework for forward trust between 3PIP vendors, SoC design houses, fabrication entities, and assembly entities can be achieved, and the unwanted modification of IP can be prevented.

8 Claims, 10 Drawing Sheets

(51) Int. Cl.
  G09C 1/00     (2006.01)
  H04L 9/16     (2006.01)
  H04L 9/06     (2006.01)
  H04L 9/32     (2006.01)
(52) U.S. Cl.
  CPC .............. *H04L 9/0662* (2013.01); *H04L 9/08* (2013.01); *H04L 9/14* (2013.01); *H04L 9/16* (2013.01); *H04L 9/3236* (2013.01); *H04L 9/3247* (2013.01); *H04L 2209/127* (2013.01); *H04L 2209/26* (2013.01)
(58) Field of Classification Search
  CPC .................. H04L 9/3236; H04L 9/3247; H04L 2209/127; H04L 2209/26; G09C 1/00
  See application file for complete search history.

(56) References Cited

U.S. PATENT DOCUMENTS

| | | | |
|---|---|---|---|
| 2004/0199885 A1 | 10/2004 | Lu et al. | |
| 2006/0106836 A1* | 5/2006 | Masugi | H04L 63/104 |
| 2008/0270805 A1 | 10/2008 | Kean | |
| 2010/0284539 A1* | 11/2010 | Roy | H03K 19/17768 380/278 |
| 2011/0113392 A1 | 5/2011 | Chakraborty et al. | |
| 2011/0210829 A1 | 9/2011 | Kean | |
| 2013/0346928 A1 | 12/2013 | Li et al. | |

OTHER PUBLICATIONS

Alkabani et al., *Remote Activation Of ICs For Piracy Prevention And Digital Right Management*. In Proceedings of the IEEE/ACM International Conference on Computer-Aided Design, (2007), pp. 674-677.

Alkabani et al., *Active Hardware Metering For Intellectual Property Protection And Security*, In Proceedings of 16th USENIX Security Symposium on USENIX Security Symposium, (2007), Article 20, 16 pages.

Baumgarten et al., *Preventing IC Piracy Using Reconfigurable Logic Barriers*, IEEE Design and Test of Computers 27, 1 (Jan.-Feb. 2010), pp. 66-75. DOI:http://dx.doi.org/10.1109/MDT.2010.24.

Castillo et al., *IPP@HDL: Efficient Intellectual Property Protection Scheme for IP Cores*, IEEE Transactions On Very Large Scale Integration (VLSI), vol. 15, No. 5, May 2007, pp. 578-591. DOI:http://dx.doi.org/10.1109/TVLSI.2007.896914.

Chakraborty et al., *Hardware Protection And Authentication Through Netlist Level Obfuscation*, In Proceedings of the IEEE/ACM International Conference on Computer-Aided Design, (2008), pp. 674-677. DOI:http://dx.doi.org/10.1109/ICCAD.2008.4681649.

Chakraborty et al., *HARPOON: An Obfuscation-Based SoC Design Methodology for Hardware Protection*, IEEE Transactions on Computer-Aided Design of Integrated Circuits and Systems, vol. 28, No. 10, (Oct. 2009), pp. 1493-1502. DOI:http://dx.doi.org/10.1109/TCAD.2009.2028166.

Charbon, *Hierarchical Watermarking In IC Design*, In Custom Integrated Circuits Conference, 1998, In Proceedings of the IEEE 1998, pp. 295-298. DOI:http://dx.doi.org/10.1109/CICC.1998.694985.

Contreras et al., *Secure Split-Test for Preventing IC Piracy by Untrusted Foundry and Assembly*, In Proceedings of the IEEE International Symposium on Defect and Fault Tolerance in VLSI and Nanotechnology Systems (DFTS), (2013), pp. 196-203.

Holcomb et al., *Initial SRAM State As A Fingerprint And Source Of True Random Numbers For RFID Tags*. In Proceedings of the Conference on RFID Security, (2007), 12 pages.

Huang et al., *IC Activation And User Authentication For Security-Sensitive Systems*, In Proceedings of the IEEE International Workshop on Hardware-Oriented Security and Trust, (2008), pp. 76-80. DOI:http://dx.doi.org/10.1109/HST.2008.4559056.

Jeong et al., *Emerging Memories: Resistive Switching Mechanisms And Current Status*, Reports on Progress in Physics 75, 7 (2012), 076502, 31 pages. DOI:http://10.1088/0034-4885/75/7/076502.

Kahng et al., *Constraint-Based Watermarking Techniques For Design IP Protection*. IEEE Transactions On Computer-Aided Design Of Integrated Circuits and Systems, vol. 20, No. 10, Oct. 2001, pp. 1236-1252. DOI:http://dx.doi.org/10.1109/43.952740.

Kahng et al., *Constraint-based Watermarking Techniques for Design IP Protection*, IEEE Transactions On Computer-Aided Design Of Integrated Circuits and Systems, vol. 20, No. 10, Nov. 2006, 1236-1252. DOI:http://dx.doi.org/10.1109/43.952740.

Kirovski, et al., *Protecting Combinational Logic Synthesis Solutions*, IEEE Transactions On Computer-Aided Design of Integrated Circuits and Systems, vol. 25, No. 12, Dec. 2006, pp. 2687-2696. DOI:http://dx.doi.org/10.1109/TCAD.2006.882490.

Koushanfar, *Provably Secure Active IC Metering Techniques for Piracy Avoidance and Digital Rights Management*, IEEE Trasactions On Information Forensics and Security, vol. 7, No. 1, Feb. 2012, pp. 51-63. DOI:http://dx.doi.org/10.1109/TIFS.2011.2163307.

Koushanfar et al., *Hardware Metering*, IEEE—ACM Design Automation Conference, (2001), pp. 490-493. DOI:http://dx.doi.org/10.1109/DAC.2001.156189.

Kumar et al., *Extended Abstract: The Butterfly PUF Protecting IP On Every FPGA*, In Proceedings of the IEEE International Workshop on Hardware-Oriented Security and Trust, (2008) pp. 67-70. DOI:http://dx.doi.org/10.1109/HST.2008.4559053.

Lach et al., *Fingerprinting Techniques For Field-Programmable Gate Array Intellectual Property Protection*. IEEE Transactions On Computer-Aided Design of Integrated Circuits and Systems, vol. 20, No. 10, Oct. 2001, pp. 1253-1261. DOI:http://dx.doi.org/10.1109/43.952741.

Lee et al., *A Technique To Build A Secret Key In Integrated Circuits For Identification And Authentication Applications*, Symposium On VLSI Circuits Digest of Technical Papers, (2004), pp. 176-179. DOI:http://dx.doi.org/10.1109/VLSIC.2004.1346548.

Lofstrom et al., *IC Identification Circuit Using Device Mismatch*. In Proceedings of IEEE International Solid-State Circuits Conference, (2000), 2 pages. DOI:http://dx.doi.org/10.1109/ISSCC.2000.839821.

Miyamoto et al., *Systematic Design of RSA Processors Based on High-Radix Montgomery Multipliers*. IEEE Transactions On Very Large Scale Integration (VLSI) Systems, vol. 19, No. 7, Jul. 2011, pp. 1136-1146. DOI:http://dx.doi.org/10.1109/TVLSI.2010.2049037.

Dworkin, *Recommendation for Block Cipher Modes of Operation: Methods and Techniques*, NIST Special Publication 800-38A, (2001), 66 pages.

Rahman et al., *CSST: Preventing Distribution Of Unlicensed And Rejected Ics By Untrusted Foundry And Assembly*, 2014 International Symposium On Defect and Fault Tolerance In VLSI and Nanotechnology Systems (DFT) (2014), pp. 46-51.

Rajendran et al., *Security Analysis Of Logic Objiiscation*, In Design Automation Conference (DAC), (2012) 49th ACM/EDAC/IEEE, pp. 83-89.

Rivest et al., *A Method For Obtaining Digital Signatures And Public-Key Cryptosystems*, Communications of the ACM, vol. 21, No. 2. (Feb. 1978), pp. 120-126.

Roy et al., *EPIC: Ending Piracy of Integrated Circuits*. In Proceedings on Design, Automation and Test in Europe, (2008), pp. 1069-1074. DOI:http://dx.doi.org/10.1109/DATE.2008.4484823.

Su et al., 2007. *A 1.6pJ/bit 96% Stable Chip-ID Generating Circuit Using Process Variations*. In Proceedings of IEEE International Solid-State Circuits Conference, (2007), 3 pages. DOI:http://dx.doi.org/10.1109/ISSCC.2007.373466.

Subramanyan et al., *Evaluating The Security Of Logic Encryption Algorithms*, 2015 IEEE International Symposium On Hardware Oriented Security and Trust (HOST), (2015), pp. 137-143. DOI:http://dx.doi.org/10.1109/HST.2015.7140252.

Suh et al., *Physical Unclonable Functions for Device Authentication and Secret Key Generation*. In Proceedings of ACM/IEEE on Design Automation Conference, (2007), pp. 9-14.

(56) References Cited

OTHER PUBLICATIONS

Sunar et al., *A Provably Secure True Random Number Generator With Built-In Tolerance To Active Attacks*, IEEE Transactions On Computers, vol. 56, No. 1, Jan. 2007, pp. 109-119. DOI:http://dx.doi.org/10.1109/TC.2007.250627.

Zhuang et al., *Hardware Assisted Control Flow Obfuscation For Embedded Processors*. In Proceedings of the 2004 International Conference on Compilers, Architecture, and Synthesis for Embedded Systems (CASES '04). ACM, New York, NY, USA, (2004), pp. 292-302. DOI:http://dx.doi.org/10.1145/1023833.1023873.

International Searching Authority, International Search Report and Written Opinion for International Application No. PCT/US2017/037403, dated Dec. 27, 2017, (10 pages), Korean Intellectual Property Office, Republic of Korea.

\* cited by examiner

```
module secret (a, b, clk, y);
    input a,b,clk;
    output y;
`pragma protect begin
    reg y=0;
always @(posedge clk) begin
    y = a & b;
end
`pragma protect end
endmodule
```
a) An IP.

```
module secret (a, b, clk, y);
    input a, b, clk;
    output y;
`pragma protect data_block
EopI45XzfdgMCrd6bQoMzZpf0J5X7U0e
Q3SiPiPt3uuZhYazA5xZQS+aD7ySO+rV
Q/msi5/CE5VsxtCSc8SVhFeniUjlsp
IjMKpVHvv+2pw=
`pragma protect end_protected
endmodule
```
b) Encrypted IP.

```
module secret_modified (a, b, clk, y, q );
    input a, b, clk;
    output y, q;
assign q=a | b;
`pragma protect data_block
EopI45XzfdgMCrd6bQoMzZpf0J5X7U0eQ3SiPiPt3uuZhYazA5xZQS+aD7ySO+rVQ
/msi5/CE5VsxtCSc8SVhFeniUjlspIjMKpVHvv+2pw=
`pragma protect end_protected
endmodule
```
c) Modified encrypted IP.

Figure 2

COMPREHENSIVE FRAMEWORK FOR PROTECTING INTELLECTUAL PROPERTY IN THE SEMICONDUCTOR INDUSTRY

CROSS REFERENCE TO RELATED APPLICATIONS

This application is a 371 National Stage Application of PCT/US2017/037403, filed Jun. 14, 2017, which claims the benefit under 35 § U.S.C 119(e) of U.S. Provisional Patent Application No. 62/349,876, filed Jun. 14, 2016, the contents of all of which are incorporated herein by reference in their entirety.

BACKGROUND OF THE INVENTION

The persistent trend of device scaling has enabled designers to fit more and more functionality on a system-on-chip (SoC) to reduce overall area and system costs. As the complexity has grown exponentially, it is difficult if not impossible for SoC designers to design a complete system on their own. Nowadays, SoC designers generally obtain licenses for various functional blocks (known as intellectual properties or IPs) for their SoCs to optimize the design process, decrease time-to-market, and increase performance.

In parallel, the increased complexity of the fabrication process has resulted in a majority of SoC designers no longer maintaining fabrication facilities (i.e., a fab or foundry) of their own. Building and maintaining such fabs for modern SoCs are reported to cost upwards of several billions of dollars. Given this increasing cost, the semiconductor business has largely shifted to a contract foundry business model (horizontal business model) over the past two decades. In this business model, SoC designers first get licenses for third party intellectual properties (3PIPs) to be used in their SoC designs, design the SoCs by integrating the various 3PIPs, and then outsource the SoC design to manufacturing entities for fabrication and packaging, which reduces time-to-market and manufacturing costs. This segmentation of the SoC design and fabrication process has led to difficulties in third party IP providers and SoC designers controlling the use of their intellectual property. Therefore, new methods, frameworks and system designs are needed to ensure intellectual property protection between third party intellectual property providers, SoC designers, and fabrication entities.

BRIEF SUMMARY

Embodiments of the present invention include methods and integrated circuit architectures for assuring the protection of intellectual property between third party IP owners, system designers (e.g., SoC designers), fabrication entities, and assembly entities. Embodiments also include novel design flows for the prevention (or inhibition) of IP overuse, IP piracy, and IC overproduction. Embodiments of the present invention can provide a comprehensive framework for forward trust between 3PIP owners, SoC design houses, fabrication entities, and assembly entities. Embodiments of the present invention can also prevent the unwanted modification of IPs.

A method according to an embodiment of the present invention can include incorporating logic encryption techniques to obfuscate the netlist of an SoC or a 3PIP. Embodiments of the present invention may also include enabling manufacturing tests before the activation of chips to prevent (or inhibit) IC overproduction.

A method according to an embodiment of the present invention can include using asymmetric and symmetric key encryption (e.g., in a similar fashion to 'Pretty Good Privacy') to transfer keys from the SoC designer or 3PIP owners to the chips. In addition, embodiments can also include attaching an IP digest (e.g., a cryptographic hash of the entire IP) to the header of an IP to prevent (or inhibit) modification of the IP by SoC designers.

BRIEF DESCRIPTION OF THE DRAWINGS

FIG. 2a shows an example of a very simple IP that performs an AND operation every clock cycle.

FIG. 2b shows the IP of FIG. 2a after it has been encrypted using SYNOPSYS encryptP1735.pl script.

FIG. 2c shows a modified encrypted IP of FIG. 2b in which the attacker adds an extra feature or operation to the existing operation.

DETAILED DESCRIPTION

Figure 1:
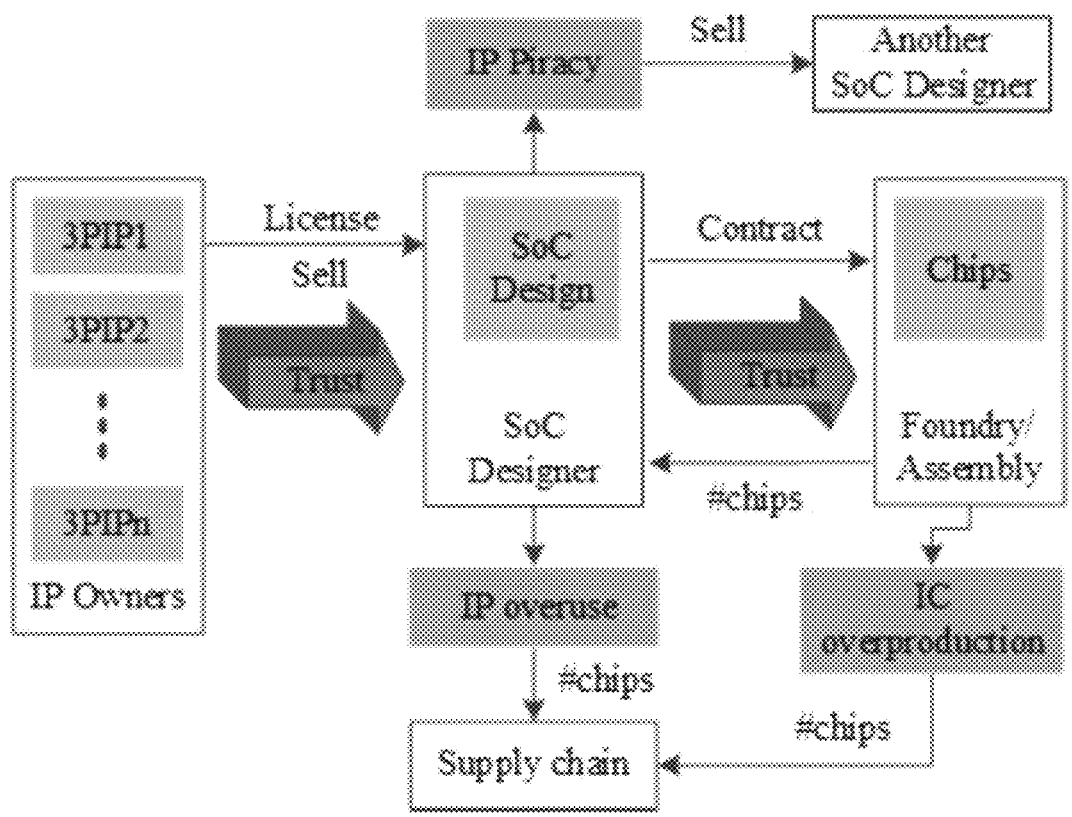
FIG. 1 is a schematic diagram illustrating the typical parties, relationships, and trust issues involved in the modern design and fabrication of SoCs and ICs.

FIG. 1 is a schematic diagram illustrating the parties and relationships involved in the modern design and fabrication of SoCs and ICs. In modern SoC design and fabrication, forward trust does not exist between the participating entities. The 3PIP (third party intellectual property) owners cannot have complete trust in the SoC designers, and the SoC designers may not trust the fabrication facilities. The lack of transparency and the resulting lack of trust may lead to the following vulnerabilities, as shown in FIG. 1.

IP Overuse: The SoC designer may produce more ICs and report a lesser amount to the intellectual property (IP) owners to avoid licensing costs. At the same time, the SoC designer may illegally use an IP that was licensed to be used in a different design. In short, the IP owners have little or no means to verify how many chips have been fabricated with their IPs and where they have been used.

IP Piracy: An SoC designer may legally purchase a 3PIP core from an IP vendor and then make clones, or illegitimate copies of the original IP. Similarly, untrusted foundries may sell illegal copies of the GDSII files that they receive from SoC designers for fabrication. Further, the integrity of the IP may be at risk. An untrusted SoC designer can add some extra features to those 3PIPs to make them look different and then sell them to another SoC designer. An SoC designer may also modify a 3PIP in order to introduce a backdoor or hardware Trojan into the chip.

IC Overproduction: Untrusted foundries and assemblies may produce more than the number of chips they are contracted to manufacture. As no R&D costs are incurred for these chips, they can receive illegitimate profits by selling these chips with the name of the SoC designer. In addition, they can also overbuild chips at practically zero cost by reporting a lower yield (i.e., percentage of defect-free chips to the total number of chips) to the SoC designer.

When an untrusted party overuses IPs or overproduces ICs, the IP owners and the SOC designers lose revenue that could have been gained from those chips. However, an even bigger concern with these ICs is that of reliability. An IC that uses a pirated IP may create a backdoor to leak secret information to the attacker or disable a system at some critical point in time. In addition, overproduced ICs may simply end up in the market with minimal or no testing for reliability and functionality. These ICs may also find their way into the supply chain for many critical applications, which raises concerns for safety and reliability. Since these ICs use the name of the SoC designers, their failure could tarnish company reputation.

Existing technologies cannot fully address the existing problems and can be classified into three major categories: logic obfuscation, hardware watermarking, and IC metering.

Logic obfuscation is a technique in which a design is transformed to obfuscate the inner details of the original design, yet its original functionality is preserved. Methodologies have been proposed that can be integrated into the SoC design and manufacturing flow to simultaneously obfuscate and authenticate a design. In this approach, the circuit operates in a normal mode when it receives a predefined sequence of patterns, known as a key, at its input. However, it is unclear in the prior art how this key will be hidden from the foundries or assemblies to prevent overproduction. In addition, this technique does not address IP overuse.

Encrypting a netlist by using a lock (a sequence of XOR/XNOR gates) that can only be unlocked by using a chip unlock key (CUK) is another option. However, this design is not resistant to reverse engineering as key gates are directly related to the key bits (XOR and XNOR gates indicate 0 and 1 at CUK location, respectively) and vulnerable to key sensitization attacks. This problem has been addressed by proposing different logic encryption techniques. However, it has been shown that any logic encrypted circuit can be broken with the assumption that an attacker can use the scan-chain to read/write the values of all flip-flops in the design. This assumption does not conform to today's designs. Every design now uses test compression architecture to significantly reduce testing costs by reducing test time and test data volume. Test responses are compacted many folds before becoming available for off-chip access. As the modern electronic design automation (EDA) tools provide diagnostic support (high defect coverage and accurate fault diagnostics) with compression in place, it is impractical not to incorporate test compression in the design. It is therefore impractical (or impossible) to access the individual flip-flop values (the output of the combinational circuit, Y for a solution to a QBF) for chips where the design uses test compression. This also makes it impossible to find a key using the approach suggested by the authors by looking at the compacted scan output values. Thus, it is still safe to use such schemes to encrypt netlists.

The Design Automation Standards Committee of the IEEE has recently developed the standard P1735 [DASC 2014] to provide guidance for encryption and management of IPs, which has been adopted by most IP and EDA vendors. In the encryption approach, the IP is encrypted with a random symmetric session key. This session key is then encrypted with the public keys of different EDA vendors and attached to the IP such that these vendors can later reconstruct the original IP. FIG. 2(a) shows a very simple IP that performs an AND operation in every clock cycle. To protect from any unwanted modification, the IP can be encrypted (e.g., using SYNOPSYS encryptP1$^{735}$.pl script [SYNOPSYS 2014]). In this encryption process, the code inside the 'pragma protect block (encircled in FIG. 2(a)) is encrypted. The encrypted IP is shown in FIG. 2(b), where the code inside the 'pragma protect block (encircled) is no longer recognizable. During decryption, the session keys are decrypted using the private key of the EDA vendor and then encrypted portions of the IP are decrypted using this session key. Unfortunately, this encryption approach cannot prevent placing additional features on existing IP as it does not provide integrity verification. FIG. 2(c) shows a modified encrypted IP where the attacker adds an extra feature (OR operation) to the existing one (AND operation). This application will provide a solution by adding an IP digest resulting from a cryptographic hash function in the IP header to prevent any unauthorized modifications. In addition, the encrypted IP does not provide any protection against copying of the whole IP to make an exact clone. As one of the techniques provided in this application purposes using an encrypted netlist, copying the entire IP will not help an attacker unless the attacker possesses a valid CUK, which is discussed below.

Hardware watermarking has received much attention in the recent years for validating the authorship of an IP. Watermarking techniques uniquely identify an IP by creating a unique fingerprint. As the watermarking technique is passive, one cannot use it to prevent IP overuse, IP piracy, and IC overproduction. Rather, it can only be used to verify the use of a particular IP.

The existing IC metering approaches prevent IC overproduction by attempting to give an SoC designer control over the number of ICs manufactured. These approaches can be either passive or active. Passive approaches uniquely identify each IC and register the ICs using challenge-response pairs. Later, suspect ICs taken from the market are checked for proper registration.

For passive metering techniques, one major limitation is that they cannot "actively prevent" overproduction. PUF-based detection techniques rely on matching unclonable IDs/signatures generated by the PUF. The challenge-response pairs are stored in a secure database and verified later, whether the responses are listed in the database or not. In this context, the SoC designers have to count on the foundries/assemblies to send all defect free chips and trust them blindly on yield information. Therefore, an untrusted foundry/assembly can hide actual yield information and build a large number of defect-free unregistered chips, which can be distributed to a variety of places including subsidiary companies, rogue system integrators, and others looking for low cost parts. These untrusted entities might not care about the authenticity of the ICs.

Active metering approaches lock each IC until it is unlocked by the SoC designer. The PUF-based active metering techniques of the prior art have applicability limitations. In this proposed scheme, the foundry needs to capture the initial power-up state through the scan-chains and send that state to the design house to receive the passkeys. However, the authors did not provide solutions with test compression architecture in place. Test compression is being adopted by the IC community to significantly reduce test data, not out of preference, but out of necessity. Every design now uses test compression architecture. Test responses (the flip-flop values) are compacted many fold before becoming available for off-chip access. It is therefore impossible to access the flip-flop values unless there is a bypass of the compression module, which can create additional overhead. A similar analysis can applied to other techniques of the prior art.

Secure split-tests (SSTs) have been proposed to prevent overproduced, out-of-spec/defective, and cloned ICs. SST enables the design house to participate in the manufacturing test process by placing a set of security measures in the design and controlling the test flow. However, the major disadvantage of this approach is the back and forth communication between the SoC designer and the foundry/assembly, which increases delays in the testing process.

On-chip TRNGs have been used to generate a public-private key-pair for RSA encryption. This approach suffers from three major issues. First, there is large design overhead due to the on-chip RSA key generation. The keys (e.g., 1024 bit to achieve 80-bit security) are derived by a complex algorithm from two large prime numbers, p and q, which are generally 512 bits long each. A prime checker can be provided to verify these numbers are indeed prime. Second, the scheme assumes a secure transfer of public key from the chip to the SoC designer, which creates a vulnerability to man-in-the-middle attacks. The foundry can always intercept the public key from the chip (more interestingly, foundry initiates the communication) and replace it with a new key, which nullifies the objective of creating on-chip key-pairs. Third, the scheme suffers from key sensitization attacks.

Embodiments of the present invention include a comprehensive solution for establishing forward trust for protecting IPs and ICs against the attacks discussed above.

To prevent IC overproduction, embodiments of the present invention can include novel communication protocols for activating chips after fabrication. The protocol may be similar to "Pretty Good Privacy (PGP)," which has developed a strong reputation for secrecy email delivery systems. The design can be locked by using a set of key gates and may only be unlocked upon receiving a valid chip unlock key (CUK). Embodiments of the present invention can use an attack resistant encrypted netlist to prevent IC overproduction.

One challenge to applying this method is the transfer of the CUK from the SoC designer to the chip without it being intercepted by an untrusted party, including an untrusted foundry. To address this problem, every chip can include two static RSA keys, which are the same for all chips, and a dynamic session key, which is different for each chip. This approach does not require on-chip key generation, which significantly reduces the area overhead compared with previous techniques.

The prior art has major limitations when it comes to chip testing. Either the chip has to be unlocked or test responses have to be sent to the SoC designer, creating additional vulnerabilities and inefficiencies in the design flow. Using techniques provided by the present invention, it is unnecessary to have a CUK for test pattern generation. This allows for manufacturing tests to be performed without unlocking the chips, preventing IC overproduction while minimizing process inefficiencies.

Embodiments of the present invention can prevent IP overuse by using a trusted authentication platform (TAP) in the SoC. This TAP can be trusted by all parties involved in the SoC design, and can be imported as a trusted third party IP. Each IP can be locked with unique key gates with synthesis and test pattern generation. It is believed that the proposed IP metering approach in this application addresses the third party IP (3PIP) metering problem for the first time in a forward trust manner.

Embodiments of the present invention can prevent IP piracy by using IP encryption [DASC 2014] to obfuscate the netlist. IP integrity verification (see FIG. 9) can be included to prevent IP modification so that a malicious SoC designer or foundry cannot modify a 3PIP by adding or disabling features. In addition, the netlist can be locked by using a set of key gates to prevent the cloning of IPs. One challenge that could arise is since the 3PIPs are locked using a secret CUK, how will SoC designers simulate their SoCs. Embodiments of the present invention can address this issue by attaching the CUK to the IP header and then encrypting it using the electronic design automation (EDA) tools' public keys so that the tool can retrieve the CUK during simulation.

Design reusability has become an integral part of the SoC design process as it has increased in complexity. Unfortunately, this creates the risk of overuse of 3PIPs by untrusted SoC designers and foundries. Therefore, it is extremely important for IP owners to ensure that their IPs are not being used without their authorization, and for SoC designers to ensure that their designs are not being used without their authorization. Using the techniques outlined in this application, embodiments of the present invention can detect and prevent IP piracy, detect and prevent IC overproduction, and be highly resistant to attacks.

Figure 3:
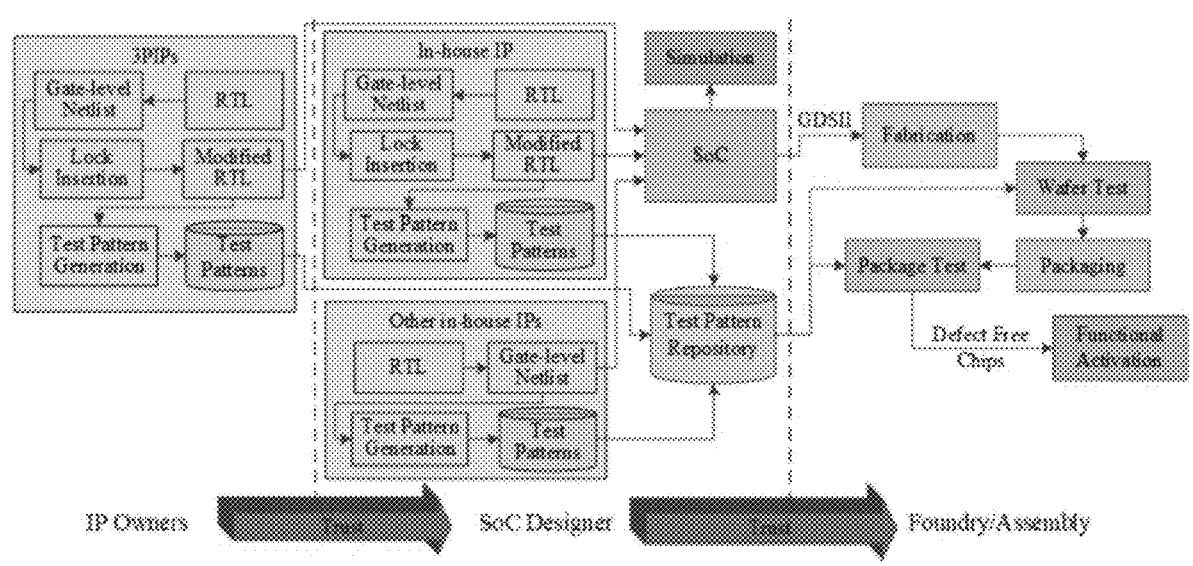
FIG. 3 shows a design flow for establishing forward trust between various entities involved with the SoC design process, according to an embodiment of the present invention.

FIG. 3 shows a proposed design flow according to an embodiment of the present invention that establishes forward trust between various entities involved with the SoC design process. The design flow shown in FIG. 3 includes lock insertion and functional activation steps. At the start of the design process, locks can be inserted using a set of key (XOR/XNOR) gates with secure logic encryption techniques. The circuit may then produce a functionally correct output when it receives a chip unlock key (CUK). The number of XOR or XNOR gates included in the design can vary and will depend on the desired level of security. The gate level netlist can also be modified to enable manufacturing tests before the activation of chips.

Each 3PIP owner can insert its own key gates to lock their design and test patterns can be generated. The SoC designer then receives all these locked IPs and integrates them in their design. The SoC designer can also insert a lock in the in-house IP to protect against IC overproduction. The SoC designer can then collect all the test patterns from different IP owners and store them in a pattern repository for future wafer and package test. As all the 3PIPs are locked, the simulation may be a challenge for SoC designers. This issue is addressed below.

The GDSII file (or other IC design file format) of the SoC design can then be sent to the foundry. The foundry first processes the wafers, which each generally contain hundreds of dies. The foundry may then perform wafer tests and inspect dies to find defects. If there are too many defective dies on a wafer, the foundry may reject the entire wafer. After wafer tests, the defect-free dies are sent to assembly for packaging. The good chips are then sorted out using package tests and the chips that do not meet the quality control standards are discarded. Finally, each chip is unlocked using a valid CUK by the entity that performs the final manufacturing tests (e.g., the foundry, the assembling entity, or the SoC designer) before being supplied to the market. Therefore, the methodologies and design flows proposed in this application do not require extensive modification of existing fabrication, packaging and test processes.

In order to prevent (or inhibit) IC overproduction, it is highly desirable to activate chips after testing has been performed, which will prevent an untrusted foundry/assembly from collecting defect free ICs by hiding actual yields from the SoC designer. An architecture is presented below that enables structural tests before the activation of chips.

FIG. 4a is a schematic diagram of an original netlist. In architectures of the prior art, structural test patterns are generated using a predetermined CUK value, due to the forward implication of the key gates. A forward implication exists when the inputs of a logic gate are assigned in a way that the output is uniquely identified. For a two input XOR gate, the other input must be specified as either 1 or 0. If a value is not assigned for CUK[i], the automatic test pattern generation (ATPG) tool will consider this input as X, and all the faults before the gate $k_i$ (the logic cone shown in shaded grey color) will be untestable due to the non-existence of the forward implication.

This point can be illustrated with an example by considering a fault D, as shown in FIG. 4(b). This fault will be testable if it is being propagated to the output $Y_{1m}$. If CUK[i] is 1, then the output of the gate $k_1$ becomes D, otherwise it becomes $\overline{D}$. The corresponding $Y_{1m}$ will be $\overline{D}$ or D depending on the CUK[i].

$$Y_{1m} = \begin{cases} D & \text{if } CUK[i] = 0 \\ \overline{D} & \text{if } CUK[i] = 1 \end{cases}$$

To maintain a forward implication, a CUK value needs to be provided during test pattern generation. Thus, the previously proposed designs need a CUK (for example, CUK[i]=0 or CUK[i]=1) before the structural test pattern generation to test all the faults before the key gate. It is then necessary to load the same key into the chips before the manufacturing test begins. If the chips are activated before the manufacturing tests, it will be difficult to prevent overproduction as an untrusted foundry/assembly can overbuild chips by asking for more keys and reporting a lower yield to the SoC designer.

In a netlist adopted by embodiments of the present invention, the ATPG tool assigns a unique value at the $I_1$ input to maintain the forward implication (assign 1, for example) for the key gate to transfer the fault $\overline{D}$ to the output $Y_{1m}$. Thus, the ATPG tool can generate test patterns (including structural and scan test patterns) and without knowing the key. These patterns will be used later during wafer and package tests to find defect free chips from a manufacturing unit.

FIG. 4c shows a proposed netlist according to an embodiment of the present invention in which the key bit CUK[i] is connected to a scan flip-flop ($FF_i$). The output of $FF_i$ drives the key gate $k_1$. In the test mode, when the scan enable (SE) signal is asserted, this flip-flop becomes a part of the scan chain. The ATPG tool then generates a test pattern for this modified netlist with n+1 inputs ($A_1, A_2, \ldots, A_n, I_1$) rather than the original netlist (FIG. 4a) with n inputs ($A_1, A_2, \ldots, A_n$) or an obfuscated netlist (FIG. 4(b)) with n inputs ($A_1, A_2, \ldots, A_n$) and CUK[i]=0/1.

A key sensitization attack will now be considered. In a key sensitization attack, the key bits are treated as Xs and propagated to the output. As the unlocked chips contain 0 or 1 at a key bit location, these key values are visible at the output and the attacker can recover the key. For traditional design for testing (DFT), where there is no compaction of test responses, the key sensitization attack works. However, this attack may not be feasible in any design that uses an on-chip test response compaction module. On-chip test response compaction is very common in current designs. Almost every chip uses response compaction to significantly reduce test data, not out of preference, but out of necessity.

Figure 5:
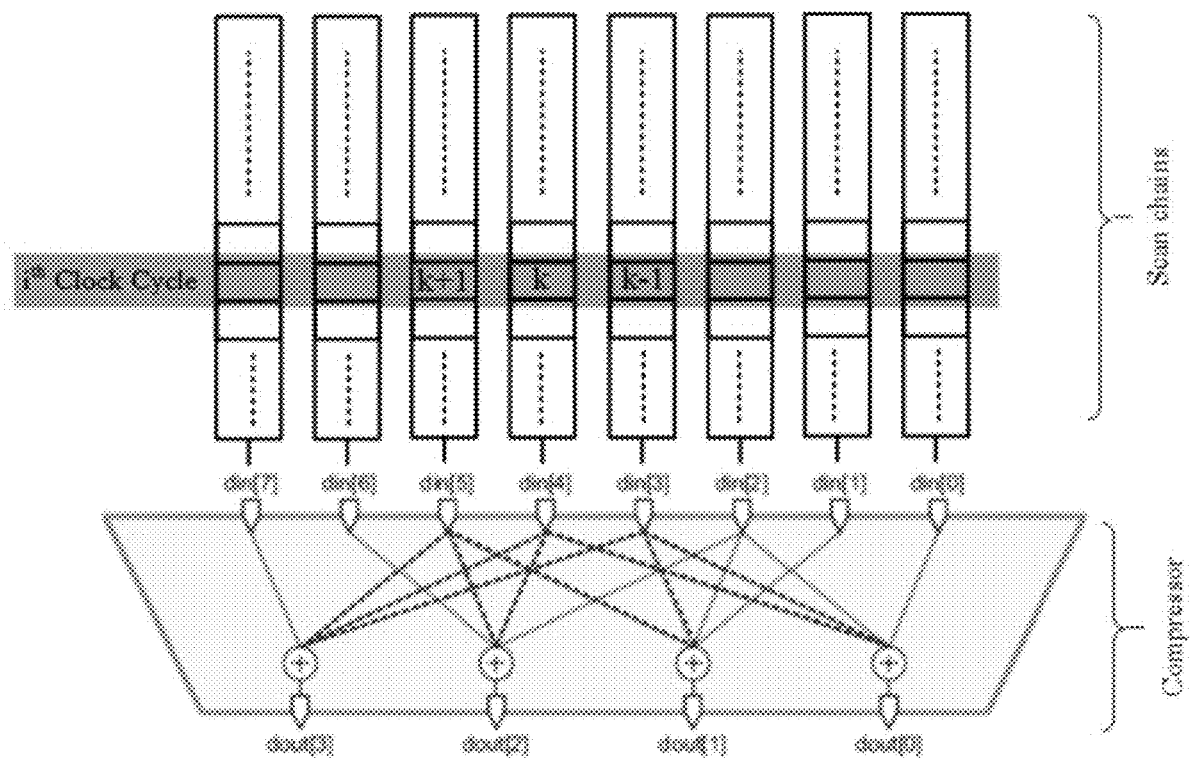
FIG. 5 is an example of a compressor logic structure for an 8-to-4 compressor.

FIG. 5 shows an example of a compressor logic structure with a compression ratio. The effect of Xs (FFs captured key bits) will be suppressed at the output $d_{out}$ if at least two of the inputs of the XOR gates in the compressor are Xs. In this example, scan chain 3, 4, and 5 can be selected. At the $i^{th}$ clock cycle three key bits (k−1, k, k+1) will be at $d_{out}$ simultaneously and their individual effect cannot be separated.

$$d\text{out}[0] = d\text{in}[4] \oplus d\text{in}[3] \oplus d\text{in}[2] \oplus d\text{in}[0] = k \oplus (k-1) \oplus \ldots = X \oplus X \oplus \ldots$$

$$d\text{out}[1] = d\text{in}[5] \oplus d\text{in}[3] \oplus d\text{in}[2] \oplus d\text{in}[1] = (k+1) \oplus (k-1) \oplus \ldots = X \oplus X \oplus \ldots$$

$$d\text{out}[2] = d\text{in}[6] \oplus d\text{in}[5] \oplus d\text{in}[4] \oplus d\text{in}[2] = (k+1) \oplus k \oplus \ldots = X \oplus X \oplus \ldots$$

$$d\text{out}[3] = d\text{in}[7] \oplus d\text{in}[5] \oplus d\text{in}[4] \oplus d\text{in}[3] = \ldots \oplus (k+1) \oplus k \oplus (k-1) = \ldots X \oplus X \oplus X]$$

The key propagation will fail as there is no forward implication for these XOR gates. Thus, by selecting the scan chains carefully and placing key gates at the same location on these scan chains, a key sensitization attack can be circumvented.

It may be possible that the diagnostics done for failure analysis may be impacted due to the compressed test responses. However, modern EDA tools provide diagnostic support (high defect coverage and accurate fault diagnostics) with compression in place. The compacted responses collected during the test can be used for diagnostics without going back to the traditional DFT (without compressions). So with this added feature, there does not appear to be a reason for SoC designers not to use test compression in their SoCs.

It is worthwhile to mention that the proposed key insertion flow does not impact the test process using JTAG [IEEE Standards Association and others 2001] in the field as the test patterns are generated after the insertion of the key gates and has no impact on CUKs. In addition, no modifications to the design are made after test pattern generation.

The success of the proposed design flow lies in the secure transfer of CUKs to the chips without interception by untrusted entities in the supply chain. In the following, the transfer of CUKs from an SoC designer to chips will be described with the goal of preventing IC overproduction by an untrusted foundry. This communication protocol will then be extended from 3PIP owners to prevent IP overuse by the untrusted SoC designer.

To ensure the safe transfer of CUKs from SoC designers to chips, message integrity, end-point authentication, and confidentiality can be included in embodiments of the present invention. The SoC designer should ensure the integrity of the request received from the chips. If the SoC designer detects an altered request, either modified by an attacker or from errors in the transmission, the transmission of the encrypted CUKs should be stopped. The SoC designer should also verify that the request was initiated by the chips and not by an untrusted foundry or another entity in the supply chain. As the chip cannot communicate on its own, the foundry only gets the information from the chip and forwards it to the SoC designer. In addition, only the SoC designer should understand the contents of the transmitted messages.

Message integrity, end-point authentication, and confidentiality can be achieved using a combination of asymmetric and symmetric key encryption. The widely used Rivest-Shamir-Adleman (RSA) algorithm can be used as the asymmetric key encryption algorithm to provide message integrity and end-point authentication. Instead of RSA, discrete logarithms or elliptic curve algorithms can also be used. Depending on the area budget, one can select one of the above methods. As an example, one-time-pad (OTP) can be used for symmetric key encryption to provide confidentiality. OTP has low area overhead as it only requires a simple XOR network for the encryption and decryption.

Figure 6:
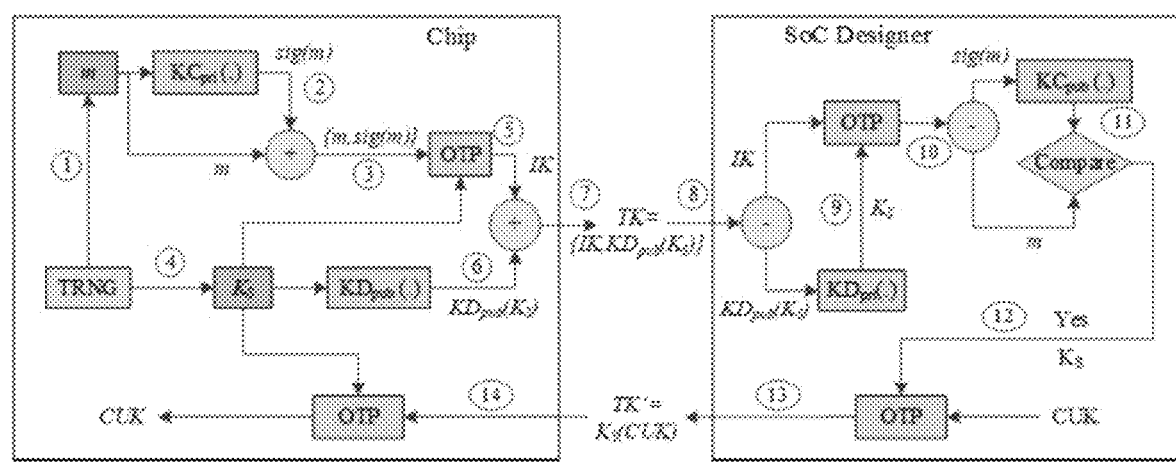
FIG. 6 is schematic diagram of a system architecture and communication flow for preventing IC overproduction, according to an embodiment of the present invention.

FIG. 6 shows a protocol according to an embodiment of the present invention that can securely transfer CUKs from an SoC designer to the fabricated chips. To achieve this, it is recommended that the keys (public key of the SoC designer ($KD_{pub}$) and private key ($KC_{pri}$) of the design) be embedded in the design. Thus, all the fabricated chips should have the same CUK, $KD_{pub}$, and $KC_{pri}$. The SoC designer should retain the other two keys, $KD_{pri}$, and $KC_{pub}$. A series of steps that can be used in embodiments of the present invention for transferring the CUK from the SoC designer to the chip are listed below:

(1) The on-chip true random number generator (TRNG) generates a message (m) which is unique for each and every chip.

(2) The message m is encrypted with the private key $KC_{pri}$ stored in the chip to form a signature, i.e., sig(m)=$KC_{pri}$(m). This signature can be used to validate message integrity and verify end-point authentication.

(3) The message m and its signature sig(m) are concatenated.

(4) The TRNG generates a random session key ($K_S$), which is unique for every communication. This session key can be stored in a non-volatile memory for future decryption to receive CUK. If the entire activation is performed while the chips are powered on, the $K_S$ can be stored in a volatile memory. This unique session key helps to prevent replay attacks.

(5) A one-time-pad (OTP) can encrypt the concatenated message (m) and its signature (sig(m)) with $K_S$.

$$IK=K_S(\{m,sig(m)\})=K_S \oplus \{m,sig(m)\}$$

(6) The session key, $K_S$, can be encrypted with the public key, $KD_{pub}$, of the SoC designer.

(7) The transmission key TK can be formed by concatenating encrypted $K_S$ and IK. TK={$KD_{pub}(K_S)$,IK}. The foundry can receive TK from the chip and forward it to the SoC designer.

(8) Upon receiving the TK from the foundry, the SoC designer can separate encrypted $K_S$ and IK.

(9) Session key $K_S$ can be retrieved by decrypting $KD_{pub}(K_S)$ with $KD_{pri}$.

$$K_S=KD_{pri}(K_S))$$

(10) A one-time-pad can be used to decrypt IK to retrieve the concatenated m, and its signature sig(m).

$$IK \oplus K_S=K_S \oplus \{m,sig(m)\} \oplus K_S=\{m,sig(m)\}$$

(11) The SoC designer can retrieve the message from the signature by using the chip's public key, $KC_{pub}$.

$$KC_{pub}(sig(m))=KC_{pub}(KC_{pri}(m))=m$$

(12) A comparison is performed to match m and decrypted signature sig(m). This step verifies the integrity of m and end-point authenticity. The SoC designer now knows that the TK is originally coming from the chip if m equals the $KC_{pub}$(sig(m)), not from an attacker.

(13) After verifying the authenticity of the sender, the SoC designer encrypts CUK by using an OTP with the session key $K_S$ and sends another transmission key (TK') to the foundry.

$$TK'=K_S(CUK)=K_S \oplus CUK$$

(14) The foundry applies this TK' to the chip. The chip now reconstructs the correct CUK after decrypting TK by using the OTP with its stored session key, $K_S$.

$$K_S(TK')=K_S \oplus CUK \oplus K_S=CUK$$

This correct CUK is then stored in a non-volatile memory (NVM) to provide inputs to the key gates. The size of the NVM depends on the size of the CUK. One should also ensure that the CUK values are not accessible by the JTAG [IEEE Standards Association and others 2001] in the field.

The overuse of IP occurs when an SoC designer has a foundry manufacture extra chips (including IC overproduction) without the knowledge of the 3PIP owners, which results in a loss of revenue for the 3PIP owners. An approach to prevent 3PIP overuse according to an embodiment of the present invention will be outlined, below.

Figure 7:
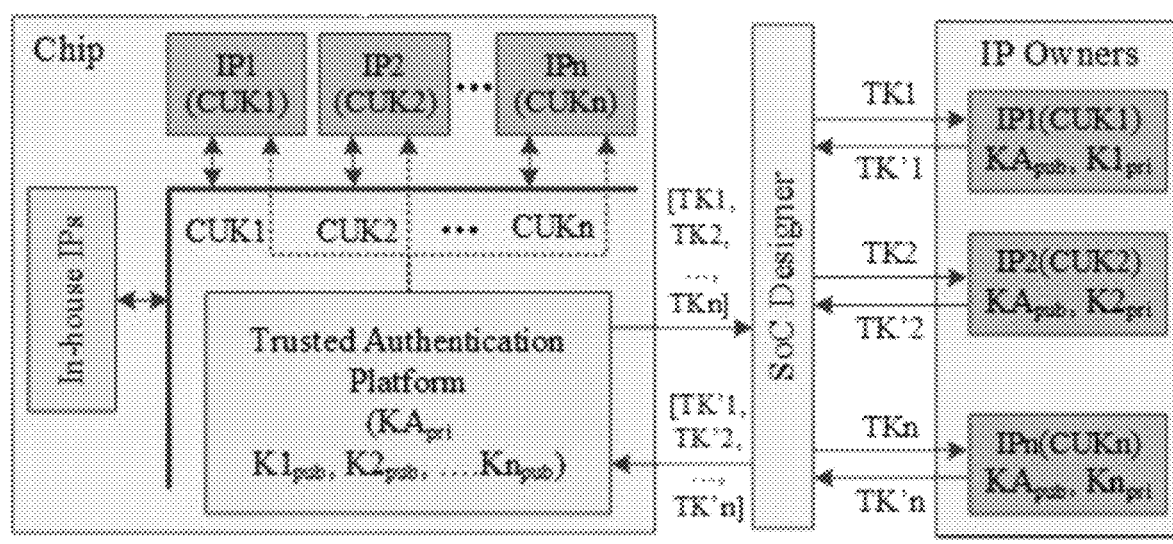
FIG. 7 is a schematic diagram of a system architecture and communication flow for the prevention of IP overuse, according to an embodiment of the present invention.

FIG. 7 shows an architecture for preventing IP overuse according to an embodiment of the present invention. The IC can include a trusted authentication platform (TAP), which is introduced in the SoC design in order to reduce the area of each 3PIP by eliminating individual encryption/decryption blocks for each IP block, and is trusted by all the 3PIPs in that SoC. In addition, TAP can be encrypted such that inner details are hidden from the SoC designer and it is modification resistant. The connection details between the TAP and 3PIPs can also be obfuscated by the EDA tool such that SoC designers cannot add additional circuitry to observe CUKs and provide them to the 3PIPs directly. Therefore, trusted EDA tools can be applied without modification for improper use by the SoC designers.

Each IP may contain a lock (i.e., the key gates) that can only be unlocked by using the correct chip unlock key $CUK_i$ of IPi. This $CUK_i$ is only known by the $i^{th}$ IP owner. The IPs only receive $CUK_i$s from the TAP for the activation. TAP holds its own private key ($KA_{pri}$) and public keys ($\{Ki_{pub}\}$) for all the IPs in the design. TAP generates the transmission keys (TK1, TK2, . . . , TKn) and sends them to the SoC designer. The SoC designer forwards each transmission key (TKi) to the corresponding IP owner. In return, the IP owners send the encrypted chip unlock key (TK'i) to the SoC designer. Upon receiving all the TK is from the IP owners, the SoC designer sends them to the foundry to unlock each IP in the fabricated chips.

Figure 8:
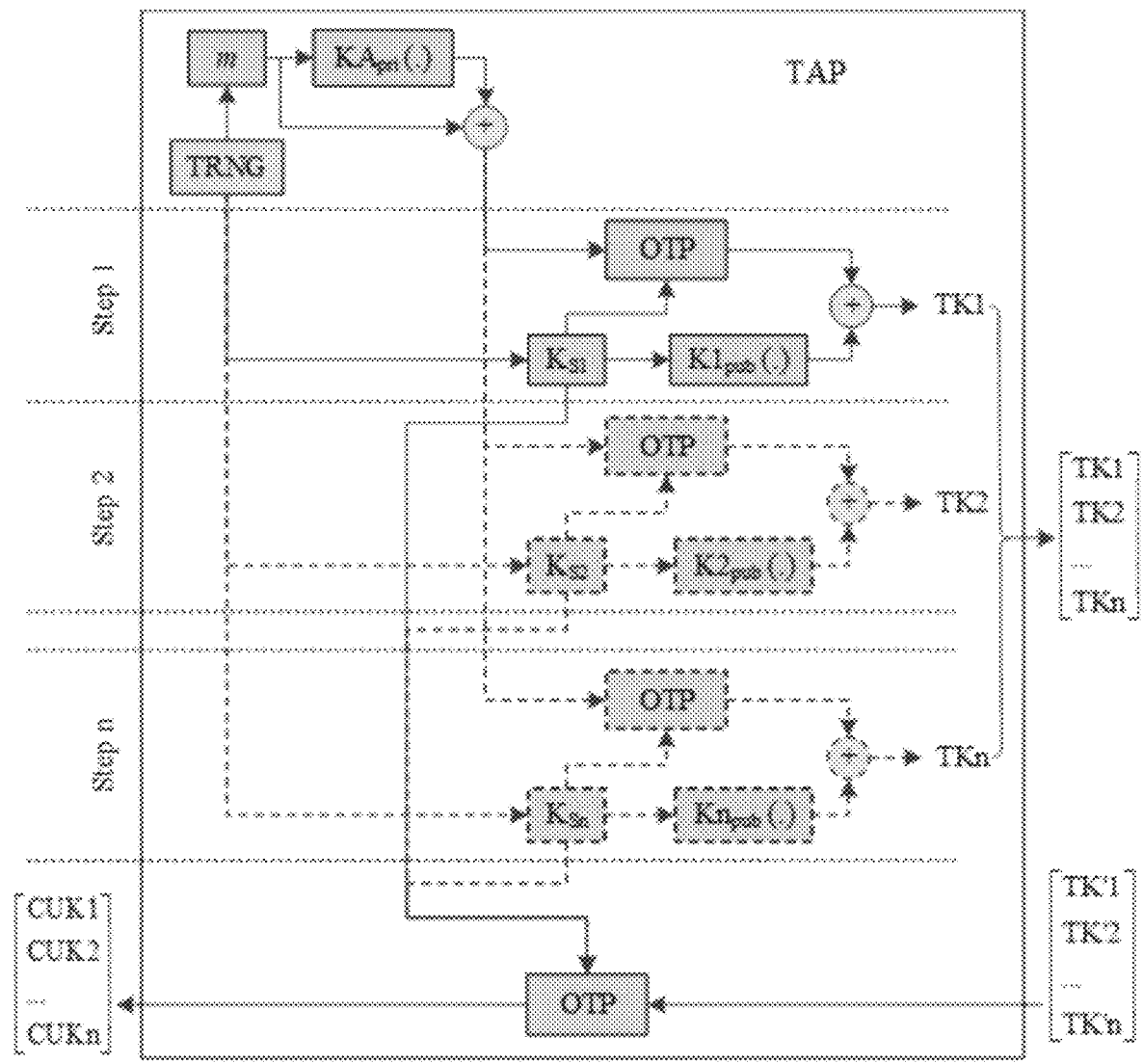
FIG. 8 is a schematic diagram of a trusted authentication platform and communication flow for reconstructing CUKs for 3PIPs in an SoC, according to an embodiment of the present invention.

FIG. 8 shows the generation of transmission keys by the trusted authentication platform. TAP has a built-in TRNG, which generates a message (m) and separate session keys ($K_S$) for all different IP owners. First, the signature of m is generated and then concatenated with its signature. This ensures message integrity and end-point-authentication for all the IP owners and also that the request is indeed coming from the TAP and not from a tampered TAP used by an attacker. TAP then generates one transmission key in each step. At step 1, a session key ($K_{S1}$) for IP owner 1 is obtained from the TRNG. This session key helps to encrypt {m, sig(m)} and the encrypted output is concatenated with the encrypted $K_{S1}$ to form TK1. At step 2, a different session key ($K_{S2}$) for IP owner 2 is received from the TRNG. This session key is then used to encrypt {m, sig(m)} and the encrypted output is concatenated with the encrypted $K_{S2}$ to form TK2. In a similar fashion, all the transmission keys (TKi) are generated. Then the foundry receives all the transmission keys, sends them to the SoC designer, and waits for the encrypted CUKs.

After receiving the transmission keys (TK'is), the foundry applies them to the TAP. TAP decrypts these TK'is by using its session keys, $K_S$s, to generate the chip unlock keys, $CUK_i$s, for all different IPs.

To establish a forward trust between the IP owners and SoC designers, foundries, and assemblies, it is suggested to add security measures in the IP to prevent IP piracy, such as, cloning, and modification of IPs by untrusted SoC designers and foundries. The methods disclosed in this application inherently prevent the cloning of IPs. As each IP is locked by using a set of key gates, even if the attackers copy the netlist completely, they cannot unlock the IPs without the proper CUK. However, simulation of an SoC having these locked 3PIPs needs to be addressed, as these IPs will work properly only upon receiving a proper CUK.

At the same time, it is necessary to protect these CUKs from the SoC designer. Otherwise, there is no point of adding them into the IPs in the first place. The objective of simulating a 3PIP will be successful if a CUK is provided securely to the simulation tool without interception by the SoC designer.

An IP integrity verification can be used to prevent or inhibit IP modification by the SoC designer. A cryptographic hash function can be used to create an IP digest to make it resistant against modification. Any modification, including addition or deletion of extra features, to a 3PIP will result in a different IP digest than the original, which can easily be detected by comparison in an EDA tool.

Figure 9:
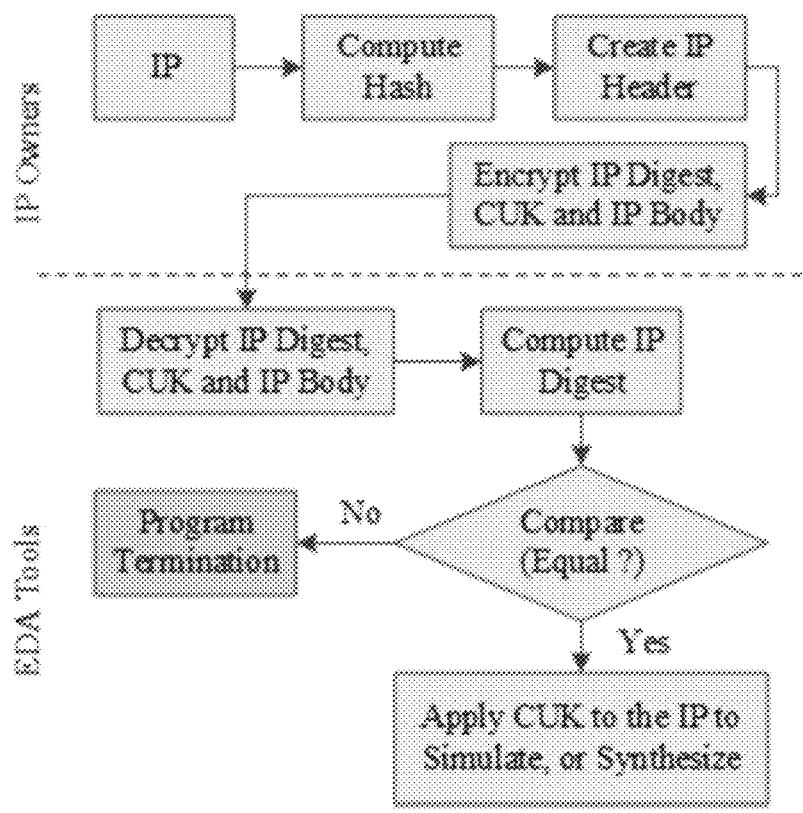
FIG. 9 is a flowchart illustrating a method for preventing IP privacy according to an embodiment of the present invention.

FIG. 9 is a flowchart illustrating a method for preventing cloning and modification of 3PIPs according to an embodiment of the present invention. The IP owners can first compute an IP digest, which is a hash of the entire locked netlist. An IP header is then created which contains the CUK for the simulation of an SoC and the IP digest. The IP is then encrypted (the code inside the 'pragma protect blocks) by using a symmetric encryption method (e.g., Advanced Encryption Standard—Cipher Block Chaining (AES-CBC) [Morris Dworkin 2001]) recommended in encryptP1735.pl script [SYNOPSYS 2014]. This symmetric key is then encrypted by the public keys of different EDA vendors such that these vendors can later decrypt them to get the IP.

This application proposes a new IP digest comparison flow during synthesis and simulation of SoCs. According to an embodiment, the EDA tool first decrypts the encrypted portion of the IP header and the IP body. An IP digest can then be calculated from the decrypted IP by using the same hash function used before to form the IP digest. A comparison may then be performed with the IP digest retrieved from the IP header and the newly computed IP digest. If they are equal, it can be assured that no modifications to the program have been made, otherwise, the program should be terminated.

Figure 10:
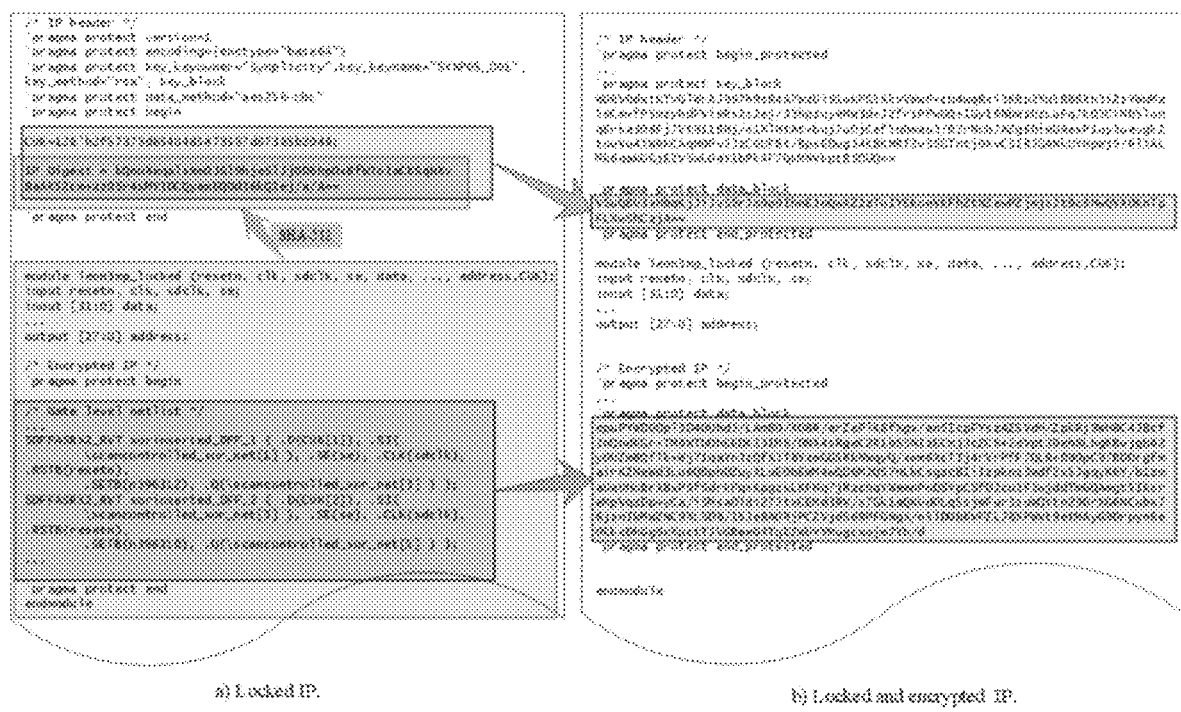
FIG. 10a shows an example of a locked IP.
FIG. 10b shows an example of a locked and encrypted IP according to an embodiment of the present invention.

FIG. 10a shows an example of a locked IP. FIG. 10b shows an example of a locked and encrypted IP according to an embodiment of the present invention. The example uses SHA-512 to form an IP digest, which is attached to the IP header along with the CUK. The example also uses SYNOPSYS encryptP1735.pl script [SYNOPSYS 2014] to encrypt the IP header and IP body. FIG. 10(a) shows a locked IP. The encryption is carried out in two parts: (i) The IP vendor encrypts the IP data (data block) using its own symmetric key which is called the data key. The example uses aes256-cbc as the symmetric encryption algorithm to encrypt the data block. (ii) The IP vendor then encrypts the data key with its public key by using asymmetric encryption to create a key block. The encryption version, encode type, key owner, key name and key method will need to be discussed. The examples use RSA as asymmetric encryption to generate the key block which is attached to the IP header (see FIG. 10(b)).

This application has presented a comprehensive solution for establishing forward trust for different entities involved in SoC design and manufacturing. The application introduces a novel communication protocol between the fabricated chips and the SoC designers/IP owners to activate the chips for preventing IP overuse and IC overproduction. The methods presented can incorporate existing logic encryption techniques to obfuscate the netlist of an SoC or a 3PIP and can only be unlocked upon receiving a chip unlock key (CUK). A modification is proposed to the existing encrypted netlist to enable manufacturing tests before the activation of chips, which is highly advantageous for preventing overproduction while maintaining process efficiency. Therefore, the proposed modifications have negligible impact on the manufacturing test process.

To address IP overuse, a trusted authentication platform has been introduced in the SoC. This TAP is trusted by the all parties involved in the SoC design. It is believed that the metering approach, to prevent IP overuse, presented in this application is the first of its kind. The encrypted IP with additional IP digest check prevents the SoC designer from IP piracy. As the IPs are locked by using a set of XOR/XNOR gates, even if the attackers copy the netlist completely, they cannot unlock it without the proper CUK, which prevents IP cloning. Finally, the proposed design flow is resistant to all known attacks.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method for preventing (or inhibiting) modification of IPs, the method comprising:
providing an IP (i.e., an item of intellectual property);
encrypting the IP with a random symmetric session key;
encrypting the random symmetric session key with a public key and attaching the encrypted random symmetric session key to the IP; and
adding an IP digest resulting from a cryptographic hash function in a IP header of the IP.

Embodiment 100

A method for preventing (or inhibiting) unauthorized overproduction of integrated circuits comprising a means for activating the integrated circuits after the integrating circuits have been tested.

Embodiment 101

The method of embodiment 100, wherein the means for activating the integrated circuits after the integrated circuits have been tested includes: locking a design by using a set of key gates and that can only be unlocked upon receiving a valid chip unlock key (CUK).

Embodiment 102

The method of any of Embodiment 100 to 101, wherein the means for activating the integrated circuits after the integrated circuits have been tested includes applying an attack resistant encrypted netlist.

Embodiment 103

The method of any of embodiments 100 to 102, wherein the means for activating the integrated circuits after the integrated circuits have been tested includes attaching two static RSA keys to every chip, which are the same for all chips, and a dynamic session key, which is different for each chip.

Embodiment 150

A method for preventing (or inhibiting) unauthorized overproduction of integrated circuits comprising ensuring message integrity, end-point authentication, and confidentiality by using a combination of asymmetric and symmetric key encryption.

Embodiment 151

The method of embodiment 151, wherein an RSA algorithm is used for asymmetric key encryption to provide message integrity and end-point authentication.

Embodiment 152

The method of embodiment 151, wherein discrete logarithms are used for asymmetric key encryption to provide message integrity and end-point authentication.

Embodiment 153

The method of embodiment 151, wherein elliptic curve algorithms are used for asymmetric key encryption to provide message integrity and end-point authentication.

Embodiment 154

The method of any of embodiments 151 to 153, wherein one-time-pad (OTP) is used for symmetric key encryption to provide confidentiality.

Embodiment 180

A method for preventing (or inhibiting) IC overproduction, the method comprising:
generating a message (m) that is unique for each and every chip by using an on-chip true random number generator (TRNG);
encrypting the message m with a private key $KC_{pri}$ that is stored in the chip to form a signature, $sig(m)=KC_{pri}(m)$, which can be used to validate message integrity and verify end-point authentication;
concatenating the message (m) and its signature sig(m);
generating a random session key ($K_S$), which is unique for every communication, using the TRNG and storing $K_S$ in volatile or non-volatile memory;
encrypting the concatenated message (m) and its signature (sig(m)) with $K_S$ using a one-time-pad (OTP) $IK=K_S(\{m, sig(m)\})=K_S \oplus \{m, sig(m)\}$;
encrypting the session key, $K_S$, with a public key, $KD_{pub}$;
forming a transmission key by concatenating the encrypted $K_S$ and IK, wherein $TK=\{KD_{pub}(K_S), IK\}$;
having the foundry receive TK from the chips and forward it to an SoC designer;
separating the encrypted $K_S$ and IK upon receiving the TK from the foundry;
retrieving the session key $K_S$ by decrypting $KD_{pub}(K_S)$ with $KD_{pri}$, wherein $K_S=KD_{pri}(KD_{pub}(K_S))$;
decrypting IK using a one-time-pad to retrieve the concatenated m, and its signature sig(m), wherein $IK \oplus K_S = K_S \oplus \{m, sig(m)\} \oplus K_S = \{m, sig(m)\}$;
retrieving the message (m) from the signature by using the chip's public key, $KC_{pub}$, wherein $KC_{pub}(sig(m))=KC_{pub}(KC_{pri}(m))=m$;
performing a comparison to match m and decrypted signature sig(m) to verify the integrity of m and end-point authenticity;
after verifying the authenticity of the sender, encrypting CUK using an OTP with the session key, $K_S$, and sending another transmission key (TK') to the foundry, wherein $TK'=K_S(CUK)=K_S \oplus CUK$;
having the foundry apply the TK' to the chip and having the chip reconstruct the correct CUK after decrypting TK' using the OTP with its stored session key, $K_S$, wherein $K_S(TK')=K_S \oplus CUK$ $K_S$=CUK; and storing the CUK in a volatile or non-volatile memory to provide inputs to the key gates.

Embodiment 200

A method for preventing (or inhibiting) overuse of IPs in integrated circuits comprising providing a trusted authentication platform (TAP), which can be trusted by all third parties, in the integrated circuits.

Embodiment 201

The method of embodiment 200, further comprising locking each of the key gates with unique key gates.

Embodiment 202

The method of any of embodiments 200 to 201, further comprising encrypting the TAP such that the inner details are hidden from SoC designers and it is modification resistant.

Embodiment 203

The method of any of embodiments 200 to 202, further comprising obfuscating connection details between the TAP and 3PIPs using and EDA tool such that SoC designers cannot add additional circuitry to observe CUKs and providing them to the 3PIPs directly.

Embodiment 204

The method of any of embodiments 200 to 202, further comprising providing a lock or key gates for each IP, which can only be unlocked by using a chip unlock key CUKi of the $i^{th}$ IP, which is only known by the $i^{th}$ IP owner.

Embodiment 300

A method for preventing (or inhibiting) IP piracy, the method comprising:
  using IP encryption to obfuscate a netlist of the IP;
  providing IP integrity verification; and
  locking the netlist using a set of key gates.

Embodiment 301

The method of embodiment 300, further comprising:
  attaching a chip unlock key to an IP header and then encrypting the IP header and the chip unlock key using an electronic design automation tools' public keys.

Embodiment 320

A method for preventing (or inhibiting) IP piracy, including preventing (or inhibiting) cloning and modification, the method comprising: computing an IP digest, which is a hash of an entire locked netlist;
  creating an IP header that contains a CUK for simulation of an of an SoC and the IP digest,
  encrypting the IP using a symmetric encryption method; and
  encrypting the symmetric keys with public keys of different electronic design automation (EDA) vendors such that the EDA vendor can later decrypt to get the IP.

Embodiment 340

A method for preventing (or inhibiting) IP piracy, including an IP digest comparison flow for synthesis and simulation of SoCs, the method comprising:
  decrypting an encrypted portion of an IP header and IP body;
  calculating an IP digest from the decrypted IP using a hash function that was used to form the IP digest;
  comparing the IP digest retrieved from an IP header and the calculated IP digest.

Embodiment 400

A comprehensive framework for protecting IPs in semiconductor fabrication, the framework comprising:
  inserting locks in a circuit using a set of key (XOR/XNOR) gates with a secure logic encryption technique such that the circuit can be unlocked after receiving a valid chip unlock key (CUK);
  modifying a gate level netlist such that manufacturing tests can be completed before chip activation;
  having each 3PIP owner insert its own key gates to lock their designs; and having an SoC designer insert a lock on in-house IP.

Embodiment 500

A comprehensive framework for establishing forward trust in semiconductor fabrication, the framework comprising:
  a means for preventing IP overuse;
  a means for preventing IP piracy;
  and a means for preventing IP overproduction.

Embodiment 501

Figure 4:
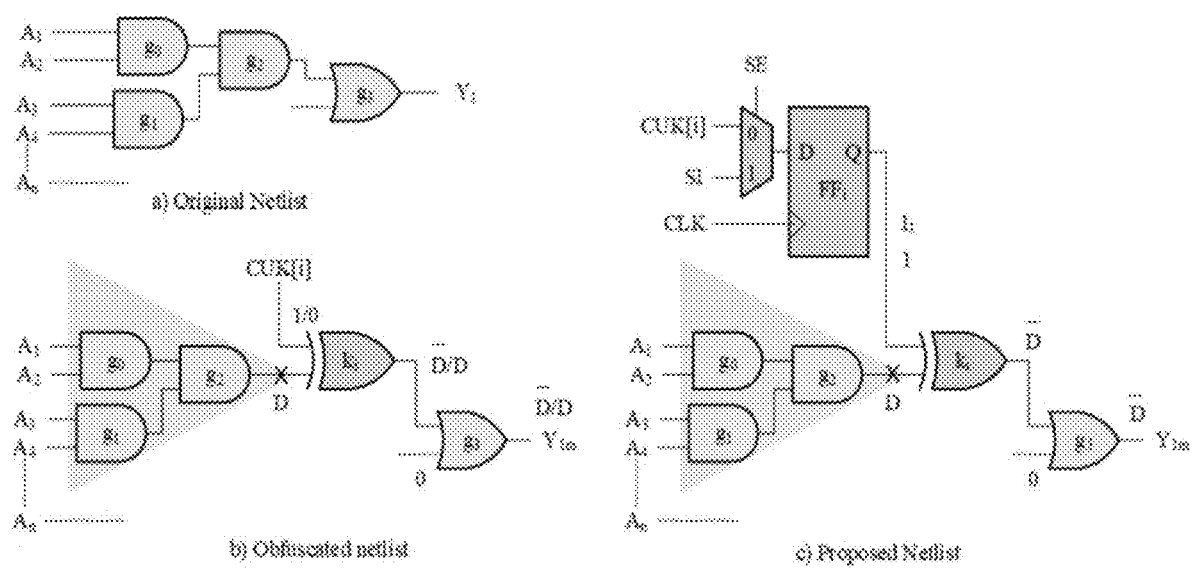
FIG. 4a is a schematic diagram of an unmodified, original netlist.
FIG. 4b is a schematic diagram of an obfuscated netlist.
FIG. 4c is a schematic diagram of a proposed netlist according to an embodiment of the present invention, wherein the key bit CUK[i] is connected to a scan flip-flop (FFi).

The comprehensive framework for establishing forward trust in semiconductor fabrication of Embodiment 501, wherein the means for preventing IP overuse comprises:
  a 3PIP owner inserting a key gate to lock their design (gate level netlist); and
  a 3PIP owner modifying the netlist to provide support for generating test patterns (see FIG. 4).

Embodiment 502

The comprehensive framework for establishing forward trust in semiconductor fabrication of any of Embodiments 500 to 501, wherein the means for preventing IP overuse comprises:
  generating test patterns to enable manufacturing tests;
  an SoC designer receiving a locked IP and integrating it into an SoC design; and
  the SoC designer collecting test patterns from different IP owners (e.g., in a depository) for future wafer and package tests.

Embodiment 503

The comprehensive framework for establishing forward trust in semiconductor fabrication of any of Embodiments 500 to 502, wherein the means for preventing IP overuse comprises:
  sending a GDSII file (or another type of IC layout file) to a foundry;

having the foundry process wafers and perform tests on wafers;

having dies that meet requirements be sent to assembly for packaging;

conducting package tests on packaged dies;

collecting CUKs from 3PIP owners, and forward the CUKs to the foundries and assemblies using a protocol such as that shown in FIG. 6.

Embodiment 510

The comprehensive framework for establishing forward trust in semiconductor fabrication of any of Embodiments 500 to 503, wherein the means for preventing IP piracy comprises:

3PIP owners locking their IPs by inserting key gates;

3PIP owners encrypting their IPs (including the CUK and an IP digest) by using the public key of a trusted EDA tool vendor before sending them to the SoC designer (As the IPs are locked and encrypted, an adversary cannot clone/tamper with it. See FIGS. 9 and 10 for details); and having the SoC designer simulate the locked and encrypted 3PIP by using a trusted EDA tool (The EDA tool uses its private key to decrypt the 3PIP, CUK, and IP digest. If the digest does not match, then the 3PIP has been modified. In this case, the EDA tool will not allow the modified 3PIP to be simulated. If the IP digest does match, the EDA tool decrypts the CUK, applies it to the 3PIP, and allows simulation. The EDA tool does not display the CUK or other secrets of the 3PIP to the SoC designer. The SoC designer can only see inputs/outputs of the 3PIP during the simulation).

Embodiment 520

The comprehensive framework for establishing forward trust in semiconductor fabrication of any of Embodiments 500 to 503, wherein the means for preventing IC overproduction comprises:

an SoC designer locking an in-house developed IP by inserting a key gate;

the SoC designer modifying the netlist to provide support for generating test patterns (see FIG. 4) (Note: Test patterns are then generated after the insertion of locks. It is highly suggested to activate the chips after the tests have been performed, which will prevent an untrusted foundry/assembly to pile up defect free ICs by hiding actual yield to the SoC designer.);

the SoC designer receiving locked IPs from different 3PIP owners and integrating them in the SoC;

the SoC designer collecting all the test patterns from different IP owners and storing them in a pattern repository for future wafer and package tests;

sending a GDSII file (or another type of IC layout file) corresponding to the SoC design to a foundry (The foundry first processes wafers, and then performs wafer test to inspect dies to find gross defects. After wafer tests, the defect-free dies are sent to assembly for packaging. The good chips are then sorted out by using package tests.);

and unlocking fabricated chips using the CUKs (The SoC designer collects all the CUKs from the 3PIP owners, and forwards those along with the CUK for in-house locked IP to the foundries and assemblies by using the protocol presented in FIG. 6).

A greater understanding of the present invention and of its many advantages may be had from the following example, given by way of illustration. The following example is illustrative of some of the methods, applications, embodiments and variants of the present invention. It is, of course, not to be considered as limiting the invention. Numerous changes and modifications can be made with respect to the invention.

Example 1

A study was conducted to prove the viability of the concepts, techniques, and methods of the present invention. The study included producing multiple test metrics followed by analysis. One objective of analyzing the test metrics was to provide evidence of the impact of the proposed modifications of the locks to enable manufacturing tests to be conducted before chip activation. An architecture according to an embodiment of the present invention was evaluated with implementations on large benchmark circuits from ITC99, opencores.org [OpenCores 2015], and OpenSPARC T1 processor core [OpenSPARC T1 2015]. In the evaluation, an SAED 32/28 nm library [SYNOPSYS 2015a] provided by SYNOPSYS was used to synthesize all benchmark circuits. Each synthesized benchmark circuit was then locked with a 128 bit CUK. A total of 128 XOR/XNOR gates along with 128 D-flip flops were inserted for each synthesized benchmark circuit. Scan-chain insertion was performed on both unsecured and secured versions of the same circuits to evaluate and compare test metrics, such as test pattern count and test coverage. A comparison between the unlocked and locked versions of these benchmarks is presented in Table II.

TABLE II

Test Metrics Comparison.

| Benchmark | Gate Count | Pattern Count | | | Test Coverage | | |
|---|---|---|---|---|---|---|---|
| | | Before | After | Change (%) | Before | After | Change (%) |
| des | 16,341 | 60 | 59 | −1.67 | 100.00 | 99.78 | −0.22 |
| b18 | 25,397 | 404 | 388 | −3.96 | 99.53 | 99.45 | −0.08 |
| ethernet | 30,534 | 627 | 629 | 0.32 | 99.94 | 99.84 | −0.10 |
| b19 | 40,789 | 424 | 418 | −1.42 | 99.34 | 99.40 | 0.06 |
| vga_lcd | 43,346 | 1,710 | 1,721 | 0.64 | 100.00 | 99.94 | −0.06 |
| leon3mp | 253,050 | 3,821 | 3,848 | 0.71 | 100.00 | 99.99 | −0.01 |
| sparc | 836,865 | 3,220 | 3,185 | −1.09 | 99.16 | 99.09 | −0.07 |

As shown in Table II, the gate count of investigated benchmark circuits ranged between 16, 341 to 836,865. These larger benchmark circuits were chosen to better represent typical large industrial designs. The pattern count and test coverage figures of the implemented designs were also presented before and after applying the proposed architecture, in order to present the impact of the proposed architecture on circuit testability. Major changes in test pattern count and test coverage are not expected, but there may be minor improvements to test coverage as each key gate with a D flip-flop adds a test point in the design. On the other hand, the XOR/XNOR gates and D flip-flops create additional faults in the netlist, which may lead to the reduction of test coverage. The shown pattern count change ranged between −3.96% and 0.71%, which means at worst the proposed architecture would result in less than 1% overhead in pattern length. Similarly, the change in test coverage ranged between −0.22% and 0.06%. In summary, both impacts are minor and would not significantly impact testability of the secured design.

The area overhead of a comprehensive framework for forward trust according to an embodiment of the present invention consists of a Rivest-Shamir-Adleman (RSA) module, a one-time pad (OTP) module, key gates, RSA keys, a true random number generator (TRNG), and non-volatile memory.

The RSA module used in the proposed design to encrypt the session key and generate the signature makes up a major part of the area overhead. This area can be reduced significantly depending on the speed of operation. If speed is not a major concern, a slower and more area efficient RSA module can be selected. It is reported that a minimum size RSA data path can be implemented by using only 861 gates [Miyamoto et al. 2011]. The size of the one-time (OTP) module depends on the size of the CUK. For a 128 bit CUK, 128 XOR gates are needed. The same OTP can be used for the encryption of {m, sig(m)} and decryption of TK'. The area overhead of the key gates also depends on the CUK. To implement one key bit, one XOR/XNOR gate and a scan flip-flop are needed.

For the RSA Keys, extra storage or logic is needed to keep or generate at least a 1024 bit $KC_{pri}$ for chips or $KA_{pri}$ for TAP. The size of the public keys ($KD_{pub}$ or $Ki_{pub}$s) can be neglected as they can be as small as 3 or 17. Only a single TRNG is necessary for generating the message, m and session keys, $K_S$ s. One possibility is using an area efficient cryptographically secure pseudorandom number generator, depending on the choice of design. The size of the non-volatile memory will depend on the session keys, $K_S$s, and a 128 bit non-volatile memory is needed to store a 128 bit $K_S$.

There is no area overhead required for any of the 3PIPs for preventing IP overuse, except for the key gates. The trusted authentication platform (TAP) provides the CUKs to all of the different 3PIPs. The primary motivation for implementing TAP in any SoC is to prevent IC overproduction.

Considering all the modules of this example, the total gate count is approximately 10K. Table III shows the overhead analysis. For benchmark circuits, it ranges from 24.52% to 1.19%. However, for industrial designs it becomes less than 1%. For Xilinx Artix-7 and Kintex-7 [Xilinx 2105a], the overhead becomes 0.77% and 0.15% respectively. It becomes negligible for Virtex-7 [Xilinx 2105b]. The area overhead may further be reduced if the original design already contains a TRNG and an RSA module, as is the case for most of the industrial designs.

TABLE III

Area overhead analysis.

| | Design | Gate Count | Overhead (%) |
|---|---|---|---|
| Benchmarks | b19 | 40,789 | 24.52 |
| | vga_lcd | 43,346 | 23.07 |
| | leon3mp | 253,050 | 3.95 |
| | spare | 836,863 | 1.49 |
| Industrial Designs | Artix-7 | 1.3M | 0.77 |
| | Kintex-7 | 6.6M | 0.15 |
| | Virtex 7 | 20M | 0.05 |

The security of the proposed protocols is of prime importance for preventing the overproduction of ICs and overuse of 3PIPs. The following paragraphs provide a security analysis of the different aspects of the proposed comprehensive framework.

The length of a chip unlock key, CUK, should be long enough such that it can withstand exhaustive key searches and brute-force attacks. At least 80 bits of security is needed as this is the lower minimum requirement for an exhaustive key search [Paar and Pelzl 2009]. To achieve this, 80 key gates (XOR/XNOR) are required. However, the key size may be increased up to 256 bits for higher security, which should not significantly impact the overall area of a modern design.

In the approach used in this example, RSA was used to encrypt the session key and generate the signature. One can achieve 80 bits of security when the key length is 1024 bits. However, 128 bits of security can be achieved with a key length of 3072 bits [Paar and Pelzl 2009]. Depending on the area budget, one can select a desired security level of n bits. One-time-pad has been used to encrypt {m, sig(m)} in this example. As the session keys, $K_S$s, are generated from a TRNG, complete secrecy can be achieved. Thus, overall RSA equivalent secrecy can be achieved in the proposed protocol.

The comprehensive security plan present in this application can prevent a man-in-the-middle attack. As the key-pairs for the RSA are generated by the IP owners and reside in the circuit, no key transfer is required. This prevents an attacker (e.g., untrusted foundry) from becoming a man-in-the-middle.

In a replay attack scenario, the attacker copies a message between two parties and re-plays that message to one or more of them. The proposed protocol in this application is inherently resistant to replay attacks as a new session key, $K_S$, is generated every time during encryption. That is, each encrypted message will be different from the previous one. In addition, the message (m) is unique for every chip, which also helps to make a unique transmission key for every chip.

As a secure logic encryption technique [Rajendran et al. 2012] is used in the comprehensive protocol discussed in this application, it is extremely hard for an attacker to find CUK by reverse engineering. Even assuming that it is possible to find the key through reverse engineering, an attacker cannot feed the CUK to a chip, as they do not know the private key of the SoC designer ($KD_{pri}$) to retrieve $K_S$. As the session key, $K_S$, is unique for every chip, it is not economical for the attackers to retrieve $K_S$ for each chip by reverse engineering. It is also assumed that the attacker cannot model the TRNG to predict its output after observing certain $K_S$s. Finally, it is extremely expensive to perform reverse engineering for modern designs manufactured with 22 nm or lower technology nodes, which also acts as a deterrent.

In a tampering with RSA keys attack scenario, an untrusted foundry reconstructs new masks to replace the keys, $KC_{pri}$ and $KD_{pub}$, with its own. This enables the foundry to unlock an unlimited number of chips when it receives the CUKs from the IP owners. Fortunately, this attack can easily be prevented by the IP owners. The SoC designer can request only one locked chip and then verify the correct keys. If the foundry replaces $KC_{pri}$ and $KD_{pub}$ with its own, the SoC designer will not be able to unlock the chip and, consequently, it can detect mask modification.

An untrusted foundry can seek to modify the masks to bypass the TRNG and write a permanent value for K, s and m. Once it knows the CUK, it can unlock any number of chips. Fortunately, this attack can also be detected by the IP owners and can be prevented. Like before, the SoC designer can request few locked chips to monitor the message, m and the session key, $K_S$. If either m or K, s from these chips are the same or biased, it would indicate tampering of the TRNG. As it is extremely expensive to design a new set of masks, there is little economic incentive for an untrusted party to manufacture a product with two different sets of masks.

In a Tampering IP Digest Attack scenario, the attacker tries to tamper with the IP digest by replacing the original IP digest with a tampered IP digest. Fortunately, this tampering can be detected. As the attacker does not have the private key of the EDA tool (it was assumed that there is a trusted EDA tool for synthesis and simulation), it cannot reconstruct the original IP from its encrypted version. If the attacker tries to modify the IP and then compute the digest, it will be different than the original.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

1. Yousra Alkabani, Farinaz Koushanfar, and Miodrag Potkonjak. 2007. Remote activation of ICs for piracy prevention and digital right management. In *Proc. of IEEE/ACM international conference on Computer-aided design*. 674-677.
2. Yousra M. Alkabani and Farinaz Koushanfar. 2007. Active hardware metering for intellectual property protection and security. In *Proc. of 16th USENIX Security Symposium on USENIX Security Symposium*. Article 20, 16 pages.
3. Baumgarten, A. Tyagi, and J. Zambreno. 2010. Preventing IC Piracy Using Reconfigurable Logic Barriers. *IEEE Design and Test of Computers* 27, 1 (January-February 2010), 66-75. DOI: http://dx.doi.org/10.1109/MDT.2010.24.
4. M. Bushnell and Vishwani Agrawal. 2000. *Essentials of Electronic Testing for Digital, Memory, and Mixed-Signal VLSI Circuits*. Springer.
5. Encarnación Castillo, Uwe Meyer-Baese, Antonio Garcia, Luis Parrilla, and Antonio Lloris. 2007. IPP@HDL: Efficient Intellectual Property Protection Scheme for IP Cores. *IEEE Trans. Very Large Scale Integr. Syst.* 15, 5 (May 2007), 578-591. DOI: http://dx.doi.org/10.1109/TVLSI.2007.896914.
6. R. S. Chakraborty and S. Bhunia. 2008. Hardware protection and authentication through netlist level obfuscation. In *Proc. of IEEE/ACM International Conference on Computer-Aided Design*. 674-677. DOI: http://dx.doi.org/10.1109/ICCAD.2008.4681649.
7. R. S. Chakraborty and S. Bhunia. 2009. HARPOON: An Obfuscation-Based SoC Design Methodology for Hardware Protection. *IEEE Transactions on Computer-Aided Design of Integrated Circuits and Systems* 28, 10 (October 2009), 1493-1502. DOI: http://dx.doi.org/10.1109/TCAD.2009.2028166.
8. E. Charbon. 1998. Hierarchical watermarking in IC design. In *Custom Integrated Circuits Conference, 1998. Proceedings of the IEEE 1998*. 295-298. DOI: http://dx.doi.org/10.1109/CICC.1998.694985.
9. G. Contreras, T. Rahman, and M. Tehranipoor. 2013. Secure Split-Test for Preventing IC Piracy by Untrusted Foundry and Assembly. In *Proc. International Symposium on Fault and Defect Tolerance in VLSI Systems*.
10. DASC. 2014. 1735-2014—IEEE Approved Draft Recommended Practice for Encryption and Management of Electronic Design Intellectual Property (IP). (2014).
11. Scott Davidson. 2015. ITC99 Benchmark Home Page. (2015). https://www.cerc.utexas.edu/itc99-benchmarks/bench.html.
12. Daniel E. Holcomb, Wayne P. Burleson, and Kevin Fu. 2007. Initial SRAM state as a fingerprint and source of true random numbers for RFID tags. In *Proceedings of the Conference on RFID Security*.
13. Jiawei Huang and J. Lach. 2008. IC activation and user authentication for security-sensitive systems. In *Proc. of IEEE International Workshop on Hardware-Oriented Security and Trust*. 76-80. DOI: http://dx.doi.org/10.1109/HST.2008.4559056.
14. IEEE Standards Association and others. 2001. 1149.1-2001—*IEEE Standard Test Access Port and Boundary Scan Architecture*. IEEE.
15. Doo Seok Jeong, Reji Thomas, R S Katiyar, J F Scott, H Kohlstedt, A Petraru, and Cheol Seong Hwang. 2012. Emerg ng memories: resistive switching mechanisms and current status. Reports on Progress in Physics 75, 7 (2012), 076502.
16. A. B. Kahng, J. Lach, W. H. Mangione-Smith, S. Mantik, I. L. Markov, M. Potkonjak, P. Tucker, Huijuan Wang, and G. Wolfe. 2001. Constraint-based watermarking techniques for design IP protection. *Computer-Aided Design of Integrated Circuits and Systems, IEEE Transactions on* 20, 10 (October 2001), 1236-1252. DOI: http://dx.doi.org/10.1109/43.952740.
17. B. Kahng, J. Lach, W. H. Mangione-Smith, S. Mantik, I. L. Markov, M. Potkonjak, P. Tucker, H. Wang, and G. Wolfe. 2006. Constraint-based Watermarking Techniques for Design IP Protection. *Trans. Comp.-Aided Des. Integ. Cir. Sys.* 20, 10 (November 2006), 1236-1252. DOI: http://dx.doi.org/10.1109/43.952740.
18. D. Kirovski, Yean-Yow Hwang, M. Potkonjak, and J. Cong. 2006. Protecting Combinational Logic Synthesis Solutions. *Computer-Aided Design of Integrated Circuits and Systems, IEEE Transactions on* 25, 12 (December 2006), 2687-2696. DOI: http://dx.doi.org/10.1109/TCAD.2006.882490.
19. F. Koushanfar. 2012. Provably Secure Active IC Metering Techniques for Piracy Avoidance and Digital Rights Management. *Information Forensics and Security, IEEE*

20. F Koushanfar and Gang Qu. 2001. Hardware metering. In *Proc. IEEE-ACM Design Automation Conference.* 490-493.
21. DOI: http://dx.doi.org/10.1109/DAC.2001.156189.
22. Farinaz Koushanfar, Gang Qu, and Miodrag Potkonjak. 2001. Intellectual property metering. In *Inform. Hiding.* Springer-Verlag, 81-95.
23. S. S. Kumar, J. Guajardo, R. Maes, G.-J. Schrijen, and P. Tuyls. 2008. Extended abstract: The butterfly PUF protecting IP on every FPGA. In *Proc. of IEEE International Workshop on Hardware-Oriented Security and Trust.* 67-70. DOI: http://dx.doi.org/10.1109/HST.2008.4559053.
24. J Kurose and K Ross. 2001. Computer Networks: A Top-Down Approach. (2001).
25. J. Lach, W. H. Mangione-Smith, and M. Potkonjak. 2001. Fingerprinting techniques for field-programmable gate array intellectual property protection. *Computer-Aided Design of Integrated Circuits and Systems, IEEE Transactions on* 20, 10 (October 2001), 1253-1261. DOI: http://dx.doi.org/10.1109/43.952741.
26. J. W. Lee, Daihyun Lim, B. Gassend, G. E. Suh, M. van Dijk, and S. Devadas. 2004. A technique to build a secret key in integrated circuits for identification and authentication applications. In *Proc. of Digest of Technical Papers on VLSI Circuits.* 176-179. DOI: http://dx.doi.org/10.1109/VLSIC.2004.1346548.
27. K. Lofstrom, W. R. Daasch, and D. Taylor. 2000. IC identification circuit using device mismatch. In *Proc. of IEEE International Solid-State Circuits Conference.* 372-373. DOI: http://dx.doi.org/10.1109/ISSCC.2000.839821.
28. Microsemi. 2014. Libero SoC Secure IP Flow User Guide for IP Vendors and Libero SoC Users. (2014). http://www.microsemi.com/document-portal/doc_view/133573-libero-soc-secure-ip-flow-user-guide.
29. Miyamoto, N. Homma, T. Aoki, and A. Satoh. 2011. Systematic Design of RSA Processors Based on High-Radix Montgomery Multipliers. *Very Large Scale Integration (VLSI) Systems, IEEE Transactions on* 19, 7 (July 2011), 1136-1146. DOI: http://dx.doi.org/10.1109/TVLSI.2010.2049037.
30. Morris Dworkin. 2001. NIST Special Publication 800-38A: Recommendation for Block Cipher Modes of Operation. (2001). Pradeep Nagaraj. 2015. *Choosing the Right Scan Compression Architecture for Your Design.* Technical Report. https://www.
31. cadence.com/rl/Resources/white papers/Test Compression wp.pdf.
32. NIST. 2012. FIPS PUB 180-4: Secure Hash Standard. (March 2012). OpenCores. 2015. https://www.opencores.org.
33. OpenSPARC T1. 2015. http://www.racle.com/technetwork/systems/opensparc/opensparc-t1-page-1444609.html.
34. Christof Paar and Jan Pelzl. 2009. *Understanding cryptography: a textbook for students and practitioners.* Springer Science & Business Media.
35. Gang Qu and Miodrag Potkonjak. 2003. *Intellectual property protection in VLSI designs: theory and practice.* Springer Science & Business Media.
36. Md Tauhidur Rahman, Domenic Forte, Quihang Shi, Gustavo K Contreras, and Mohammad Tehranipoor. 2014. CSST: Preventing distribution of unlicensed and rejected ICs by untrusted foundry and assembly. In *Defect and Fault Tolerance in VLSI and Nanotechnology Systems (DFT),* 2014 *IEEE International Symposium on. IEEE,* 46-51.
37. J. Rajendran, Y. Pino, O. Sinanoglu, and R. Karri. 2012. Security analysis of logic obfuscation. In *Design Automation Conference (DAC),* 2012 49th *ACM/EDAC/IEEE.* 83-89.
38. R. L. Rivest, A. Shamir, and L. Adleman. 1978. A Method for Obtaining Digital Signatures and Public-key Cryptosystems.
39. *Commun. ACM* 21, 2 (February 1978), 120-126.
40. J. A. Roy, F. Koushanfar, and I. L. Markov. 2008. EPIC: Ending Piracy of Integrated Circuits. In *Proc. on Design, Automation and Test in Europe.* 1069-1074. DOI: http://dx.doi.org/10.1109/DATE.2008.4484823.
41. Y. Su, J. Holleman, and B. Otis. 2007. A 1.6 pJ/bit 96 using Process Variations. In *Proc. of IEEE International on Solid-State Circuits Conference.* 406-611. DOI: http://dx.doi.org/10.1109/ISSCC.2007.373466.
42. P. Subramanyan, S. Ray, and S. Malik. 2015. Evaluating the security of logic encryption algorithms. In *Hardware Oriented Security and Trust (HOST),* 2015 *IEEE International Symposium on* 137-143. DOI: http://dx.doi.org/10.1109/HST.2015.7140252.
43. G. E. Suh and S. Devadas. 2007. Physical Unclonable Functions for Device Authentication and Secret Key Generation. In *Proc. of ACM/IEEE on Design Automation Conference.* 9-14.
44. B. Sunar, W. J. Martin, and D. R. Stinson. 2007. A Provably Secure True Random Number Generator with Built-In Tolerance to Active Attacks. *Computers, IEEE Transactions on* 56, 1 (January 2007), 109-119. DOI: http://dx.doi.org/10.1109/TC.2007.250627.
45. Synopsys. 2014. Synopsys FPGA Synthesis Synplify Pro for Lattice: User Guide. (November 2014).
46. Synopsys. 2015a. 32/28 nm Generic Library for Teaching IC Design. (2015). https://www.synopsys.com/COMMUNITY/UNIVERSITYPROGRAM/Pages/32-28 nm-generic-library.aspx.
47. Synopsys. 2015b. Compression for Highest Test Quality and Lowest Test Cost. (2015). https://www.synopsys.com/Tools/Implementation/RTLSynthesis/Test/Pages/dftmax-ultra-ds.aspx.
48. Synopsys. 2015c. DFT Compiler, DFTMAX™, and DFTMAX™ Ultra User Guide. (Septermber 2015).
49. Synopsys. 2015d. High Quality, Low Cost Test. (2015). https://www.synopsys.com/Tools/Implementation/RTL-Synthesis/Test/Pages/DFTMAX.aspx.
50. Mohammad Tehranipoor and Cliff Wang. 2012. *Introduction to Hardware Security and Trust.* Springer.
51. Mark (Mohammad) Tehranipoor, Ujjwal Guin, and Domenic Forte. 2015. *Counterfeit Integrated Circuits: Detection and Avoidance.* Springer.
52. Xilinx. 2105a. (2105). http://www.xilinx.com/publications/prodmktg/zynq7000/Zynq-7000-combined-product-table.pdf. Xilinx. 2105b. (2105). http://www.xilinx.com/publications/prod mktg/Virtex7-Product-Table.pdf.
53. Age Yeh. 2012. Trends in the global IC design service market. DIGITIMES Research. (March 2012).
54. Xiaotong Zhuang, Tao Zhang, Hsien-Hsin S. Lee, and Santosh Pande. 2004. Hardware Assisted Control Flow Obfuscation for Embedded Processors. In *Proceedings of the* 2004 *International Conference on Compilers, Architecture, and Synthesis for Embedded Systems (CASES '04).* ACM, New York, N.Y., USA, 292-302. DOI: http://dx.doi.org/10.1145/1023833.1023873.

What is claimed is:

1. A method for preventing unauthorized overproduction of an integrated circuit design, the method comprising:
    locking the integrated circuit design by inserting a set of key gates among logic gates of the integrated circuit design in accordance with at least one pre-testing key, wherein each key gate is configured to be driven by an output of a respective scan flip-flop based at least in part on a scan enable signal, a first input of the respective scan flip-flop comprising the at least one pre-testing key, and a second input of the respective scan flip-flop configured to receive a test input;
    subsequent to locking the integrated circuit design, generating a plurality of test patterns adapted to test the integrated circuit design, wherein each test pattern comprises a respective test input provided to the second input of the respective scan flip-flop, with at least one test input provided as an input to logic gates coupled to an input of each key gate; and
    activating a plurality of integrated circuits using the at least one pre-testing key, the plurality of integrated circuits fabricated based at least in part on the integrated circuit design and tested based at least in part on the plurality of test patterns and the scan enable signal.

2. The method of claim 1, further comprising applying an attack resistant encrypted netlist to the integrated circuit design.

3. The method of claim 1, further comprising attaching two static RSA keys to the integrated circuit design.

4. The method of claim 1, wherein the at least one pre-testing key is independent of design data associated with the integrated circuit design.

5. The method of claim 1, further comprising:
    encrypting a netlist associated with the integrated circuit design.

6. The method of claim 5, wherein encrypting the netlist comprises using a combination of symmetric encryption and asymmetric encryption.

7. The method of claim 6, wherein the symmetric encryption includes one-time-pad (OTP) encryption.

8. The method of claim 6, wherein the asymmetric encryption includes Rivest-Shamir-Adleman (RSA) encryption.

* * * * *